United States Patent
Lydecker et al.

(10) Patent No.: US 9,686,840 B2
(45) Date of Patent: *Jun. 20, 2017

(54) MULTI-MODE CONTROL DEVICE

(71) Applicant: ABL IP Holding LLC, Decatur, GA (US)

(72) Inventors: Stephen Haight Lydecker, Snellville, GA (US); Glen Andrew Kruse, Snellville, GA (US); Richard L. Westrick, Jr., Social Circle, GA (US); Ryan Alexis Zaveruha, Stratford, CT (US)

(73) Assignee: ABL IP Holding LLC, Decatur, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,482

(22) Filed: Apr. 13, 2016

(65) Prior Publication Data

US 2016/0227628 A1 Aug. 4, 2016

Related U.S. Application Data

(63) Continuation-in-part of application No. 14/535,929, filed on Nov. 7, 2014.

(Continued)

(51) Int. Cl.
H05B 37/02 (2006.01)
(52) U.S. Cl.
CPC ..... *H05B 37/0227* (2013.01); *H05B 37/0236* (2013.01); *H05B 37/0272* (2013.01)
(58) Field of Classification Search
CPC ............ H05B 37/0227; H05B 37/0272; H05B 37/0236; G05F 1/66
See application file for complete search history.

(56) References Cited

U.S. PATENT DOCUMENTS 5,793,123 A 8/1998 Ho et al.
6,304,008 B1 10/2001 Goto et al.
(Continued)

FOREIGN PATENT DOCUMENTS

EP 2477460 7/2012
WO 2009109032 9/2009
WO 2013136241 9/2013

OTHER PUBLICATIONS

Notice of Allowance for U.S. Appl. No. 14/535,929, mailed Dec. 16, 2015, 8 pages.
(Continued)

*Primary Examiner* — Don Le
(74) *Attorney, Agent, or Firm* — Kilpatrick Townsend & Stockton, LLP

(57) ABSTRACT

A multi-mode control device is provided for controlling a load device. A high-power interface of the control device can be electrically coupled to a high-power module. An occupancy sensor can receive a first current from the high-power module via the high-power interface, and a trigger detection device can receive a second current that is less than the first current from a low-power module via a low-power interface. The processor can switch the control device from a high-power mode for powering the occupancy sensor to a low-power mode by causing a reduction in the current provided to the occupancy sensor and causing current to be provided to the trigger detection device. The trigger detection device can detect a trigger in the low-power mode. The processor can cause the control device to operate in the high-power mode based on the trigger's detection.

20 Claims, 19 Drawing Sheets

Related U.S. Application Data

(60) Provisional application No. 61/901,600, filed on Nov. 8, 2013.

(56) References Cited

U.S. PATENT DOCUMENTS

| | | |
|---|---|---|
| 6,455,953 B1 | 9/2002 | Lam |
| 6,864,600 B2 | 3/2005 | Malinovitch |
| 7,005,760 B2 | 2/2006 | Eaton et al. |
| 7,476,988 B2 | 1/2009 | Mulhouse et al. |
| 7,582,987 B2 | 9/2009 | Kuo |
| 7,638,902 B2 | 12/2009 | Hwang |
| 7,709,975 B2 | 5/2010 | Kuo |
| 7,825,539 B2 | 11/2010 | Ye et al. |
| 8,032,771 B2 | 10/2011 | Rangeley |
| 8,106,643 B2 | 1/2012 | Tsai |
| 8,866,401 B2 | 10/2014 | Shearer et al. |
| 2006/0265617 A1 | 11/2006 | Priborsky |
| 2010/0026379 A1 | 2/2010 | Simard et al. |
| 2010/0201198 A1 | 8/2010 | Chang |
| 2011/0074226 A1 | 3/2011 | Ohno |
| 2011/0115448 A1* | 5/2011 | Elliott ............... H05B 37/0254 323/235 |
| 2011/0187271 A1* | 8/2011 | Bouws .................. H05B 37/00 315/130 |
| 2013/0062949 A1 | 3/2013 | Yan |
| 2013/0113453 A1 | 5/2013 | Shilling |
| 2013/0264879 A1 | 10/2013 | Shih et al. |
| 2013/0278062 A1 | 10/2013 | Wei et al. |
| 2015/0088331 A1* | 3/2015 | Fiedler .................... G05F 1/66 700/295 |
| 2015/0130587 A1 | 5/2015 | Lydecker et al. |
| 2015/0134136 A1 | 5/2015 | Lydecker et al. |
| 2017/0042001 A1* | 2/2017 | Chemel ............. H05B 37/0218 |

OTHER PUBLICATIONS

Office Action for Canadian Patent Application No. CA 2,870,414, mailed Apr. 11, 2016, 5 pages.

* cited by examiner

US 9,686,840 B2

MULTI-MODE CONTROL DEVICE

CROSS-REFERENCE TO RELATED APPLICATIONS

This application is a continuation in part of, and claims priority to, U.S. patent application Ser. No. 14/535,929, filed Nov. 7, 2014 and titled "Multi-Mode Control Device," now allowed, and also claims priority to U.S. Provisional Application Ser. No. 61/901,600 filed Nov. 8, 2013 and titled "Dual Power Mode System," the contents of which are hereby incorporated by reference.

U.S. patent application Ser. No. 14/535,912, entitled "Multi-Mode Control Device," which was filed on the same day as U.S. patent application Ser. No. 14/535,929, is incorporated by reference herein in its entirety.

FIELD OF THE INVENTION

This disclosure relates generally to control devices and more particularly relates to control devices having multiple power modes.

BACKGROUND

In lighting systems and other electrical systems, control devices can be used to control operations of lighting devices and other load devices. For example, a control device can be communicatively coupled to a load device. The control device can transmit control signals to the load device (or a load controller associated with the load device) that can cause the load device to change state (e.g., turn on, turn off, increase illumination, decrease illumination).

In prior solutions, a control device may be electrically coupled to a power source that is used to power the load device in such a manner that causing a reduction in the power provided to the load device also removes power from the control device. These prior solutions can prevent the control device from performing monitoring functions or other operations related to the load device when the load device is powered off.

SUMMARY

In some aspects, a multi-mode control device is provided for controlling one or more operations of a load device (e.g., a load device external to the control device, a load device included in the control device, etc.). The control device can include a high-power interface, an occupancy sensor, a trigger detection device, and a processing device. The high-power interface can be electrically coupled to a high-power module. The occupancy sensor can receive a first current from the high-power module via the high-power interface. The trigger detection device can receive a second current via a low-power interface that is less than the first current. The processing device can switch the control device from a high-power mode for powering the occupancy sensor to a low-power mode by causing a reduction in the first current provided to the occupancy sensor and causing the second current to be provided to the trigger detection device. The trigger detection device can detect a trigger in the low-power mode. The processing device can cause the control device to operate in the high-power mode based on the trigger being detected.

These and other aspects, features and advantages of the present invention may be more clearly understood and appreciated from a review of the following detailed description and by reference to the appended drawings and claims.

DETAILED DESCRIPTION

Figure 1:
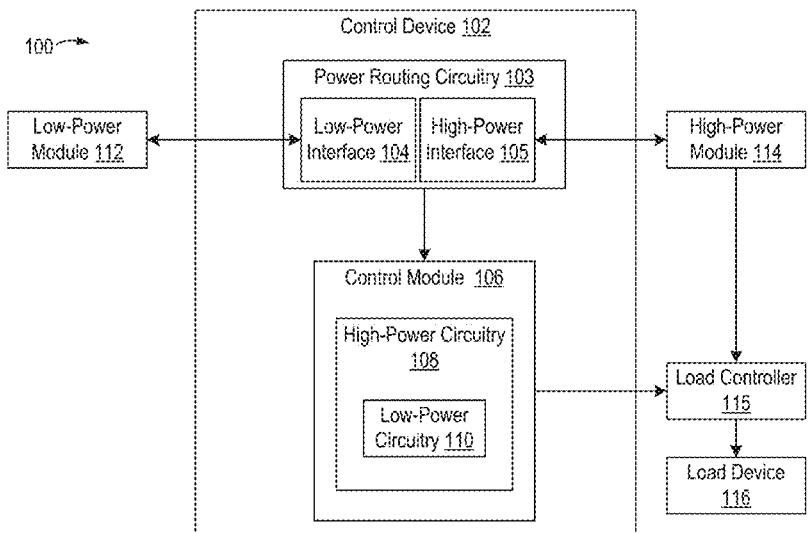
FIG. 1 is a block diagram illustrating an example of an electrical system in which a multi-mode control device can control a load device using a separate load controller according to some aspects.

Aspects of the present invention provide a multi-mode control device, also referred to herein as a control device. The multi-mode control device can control one or more operations of a load device that is communicatively coupled to the control device (e.g., via a wire that can be used to transmit a low-voltage control signal from the control device to the load device). A non-limiting example of such a control device is a lighting controller that controls the state of a lighting device (i.e. the load device). The multi-mode control device can have at least two power modes. A first power mode of the control device can correspond to the load device being energized (i.e., the load being in an "ON" state). In the first power mode, some or all components of the control device can be powered using current that is harvested or otherwise obtained from current flowing to the load device via suitable conductor (e.g., a power wire). A second power mode of the control device can correspond to the load device not being energized (i.e., the load being in an "OFF" state). In the second power mode, at least some components of the control device are powered using an alternate power source that provides lower power than would be available from the current flowing to an energized load device. Examples of an alternate source include (but are not limited to) leakage current to earth ground, a battery or other energy storage device, an energy harvesting device, etc.

In some aspects, the multi-mode control device can include a high-power interface, a low-power interface, and a control module. The high-power interface can be electrically coupled to a high-power module that provides current from an external power source to the load device. The high-power interface can receive current from the high-power module. For example, the high-power module may include one or more connections to an electrical path between the power source and the load device. The high-power module can be used to power the control device in a high-power mode. The low-power interface can be electrically coupled to a low-power module. Examples of a low-power module include connections to earth ground, a battery or other energy storage device, an energy harvesting device, etc. The low-power interface can receive current from the low-power module. The current received via the low-power interface can be less than the current received via the high-power interface. The low-power interface can prevent at least some current received via the high-power interface from flowing toward the low-power module. The control module can be electrically coupled to the high-power interface and the low-power interface.

In some aspects, an electrical coupling can involve a direct connection, such as a wire or other electrical conductor being used as a current path between the control device and the high-power module and/or between the control device and the low-power module. In other aspects, an electrical coupling can involve a wireless connection, such as an inductive transfer of current between the control device and the high-power module and/or between the control device and the low-power module.

The control device can operate in a high-power mode in which at least some devices in the control module (e.g., a microprocessor or other processing device, a radio transceiver or other communication device, etc.) are powered by the current received via the high-power interface. The control device can also operate in a low-power mode in which at least one device in the control module is powered by the current received via the low-power interface. For example, in the low-power mode, a processing device in the control module may be continuously powered by the current received via the low-power interface, and a communication device in the control module may either be unpowered or be intermittently powered by the current received via the low-power interface.

These illustrative examples are given to introduce the general subject matter discussed herein and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

FIG. 1 is a block diagram illustrating an example of a multi-mode control device 102 that can control operation of a load device 116 using a separate load controller 115 in an electrical system 100. The multi-mode control device 102 can be used to control one or more operations of a load device 116.

A non-limiting example of a multi-mode control device 102 is a lighting controller that controls the state of a lighting device (i.e., a load device 116). In some aspects, such a lighting controller can provide manual-on/occupancy-off lighting control using a remote wireless occupancy sensor. The manual-on/occupancy-off lighting control can allow a user to manually activate a switch or button to turn a lighting device on or off. When the lighting device is turned on, the occupancy sensor can determine whether an area corresponding to the lighting device is occupied. If the sensor detects that the area is no longer occupied, the lighting controller can turn off the lighting device.

In some aspects, the multi-mode control device 102 can control a load controller 115, and the load controller 115 can control the operation of a load device 116, as depicted in FIG. 1. In additional or alternative aspects, the load controller 115 can include one or more components in the multi-mode control device 102 such that the load controller 115 is wholly or partially integrated into the multi-mode control device 102.

The multi-mode control device 102 can be operated in two or more power modes, such as (but not limited to) a high-power mode and a low-power mode. The high-power mode can involve the multi-mode control device 102 using more power than the amount of power used by the multi-mode control device 102 in the low-power mode. In some aspects, both the high-power mode and the low-power mode can involve the control device 102 using less power than other devices in the electrical system 100, such as the load controller 115 or the load device 116.

The multi-mode control device 102 depicted in FIG. 1 includes power routing circuitry 103 and a control module 106. The power routing circuitry 103 can include a low-power interface 104 and a high-power interface 105. The control module 106 can include components that require power, such as a radio or other communication device, a microcontroller or other processing device, one or more load control components, one or more button interface components, one or more load voltage or load current sensing components, etc.

The low-power interface 104 can include one or more components that are used to route power that is received via a low-power module 112 to the control module 106 when the multi-mode control device 102 is in a low-power mode. In some aspects, the low-power module 112 can include a separate power source (e.g., a battery or other energy storage device). In additional or alternative aspects, the low-power module 112 can include one or more components for powering the multi-mode control device 102 using a lower current from a power source powering the load device than the current obtained from an electrical connection between the load device 116 and the power source via the high-power module 114. For example, the low-power module can include circuitry or other components for passing current from the power source through earth ground.

The high-power interface 105 can include one or more components that are used to route power that is received via a high-power module 114 to the control module 106 when the multi-mode control device 102 is in a high-power mode.

The high-power module 114 can include one or more components used for harvesting or otherwise obtaining power from current used to drive the load device 116. For example, the high-power module 114 can include one or more components that can electrically couple the multi-mode control device 102 to a line voltage or other electrical connection between a power source and the load device 116 or the load controller 115.

The low-power module 112 and high-power module 114 may be assembled using standard components. One or both of the low-power module 112 and the high-power module 114 may be designed or otherwise configured such that power supplied to the load via the high-power module 114 is not significantly affected by the power used by the multi-mode control device 102 when the load device 116 is powered. For example, the low-power module 112 may be designed or otherwise configured to pass current through earth ground. The low-power module 112 may be current limited such that no more than 500 uA is passed through earth ground.

The control module 106 can include high-power circuitry 108 that is powered using current that is obtained using the high-power module 114. The control module 106 can also include low-power circuitry 110 that is powered using current that is obtained using the low-power module 112. In some aspects, the low-power circuitry 110 can be a subset of the high-power circuitry, as depicted in FIG. 1. For example, the high-power circuitry 108 can include a microprocessor, a radio transceiver, and a relay, and the low-power circuitry 110 can include the microprocessor, but not the radio transceiver or the relay. In additional or alternative aspects, the high-power circuitry 108 and the low-power circuitry 110 can include non-overlapping sets of devices.

In some aspects, a high-power mode of the multi-mode control device 102 can correspond to the load device 116 being energized (e.g., the load device being in an "ON" state). A low-power mode can correspond to the load device 116 not being energized (e.g., the load being in an "OFF" state). In the high-power mode, some or all components of the multi-mode control device 102 can be powered using current that flows through the load device 116. In the low-power mode, at least some components of the control device can be powered using an alternate source (such as, but not limited to, leakage current to earth ground, a battery, etc.).

Figure 2:
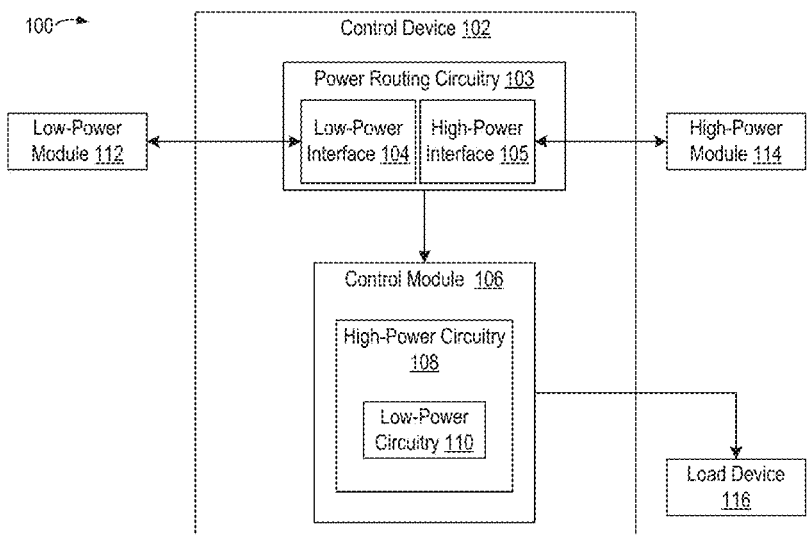
FIG. 2 is a block diagram illustrating an example of an electrical system in which a multi-mode control device is positioned in an electrical path between a power source and a load device for controlling operation of the load device according to some aspects.

Although FIG. 1 depicts the multi-mode control device 102 controlling one or more operations of a load device 116 using a separate load controller 115, other implementations are possible. For example, FIG. 2 is a block diagram illustrating an alternative example of an electrical system 100 in which the multi-mode control device 102 is positioned in an electrical path between a high-power module 114 or other power source and the load device 116. The control device 102 depicted in FIG. 2 can include one or more switching components that can selectively couple the high-power module 114 to the load device 116.

Figure 3:
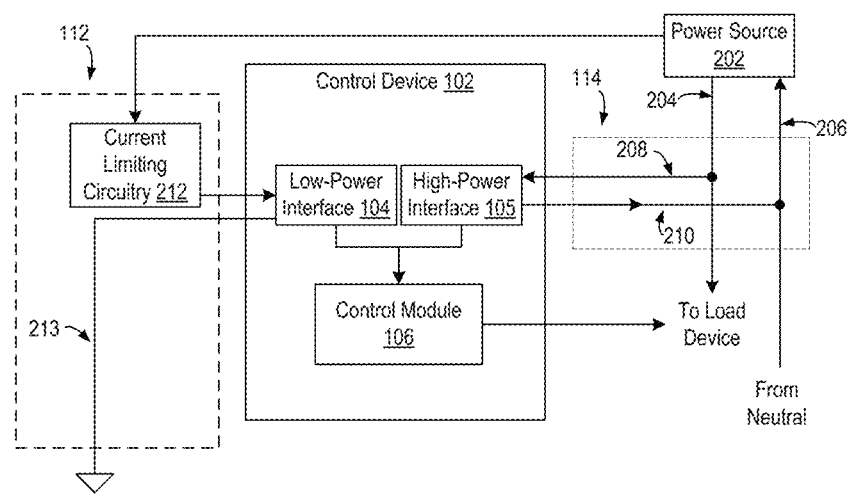
FIG. 3 is a block diagram illustrating an example of the multi-mode control device of FIG. 1 or 2 using leakage current to ground as a power source for a low-power mode according to some aspects.

In some aspects, the multi-mode control device 102 can be powered using leakage current. FIG. 3 is a block diagram illustrating an example of the multi-mode control device 102 using leakage current to ground as a power source for a low-power mode. The implementation depicted in FIG. 3 can be used in environments in which a neutral wire is not present in an electrical box used to power one or more load devices. For example, a power box may include connections to a power wire, a load wire, and earth ground. Some regulatory agencies may limit the amount of current that can be passed through earth ground (e.g., to 500 uA). The implementation depicted in FIG. 3 can use the low amount of current passed to earth ground for powering low-power circuitry 110 in a low-power mode.

As depicted in FIG. 3, the high-power module 114 can include electrical connections to a power source 202. The power source 202 can provide current to the load device 116 via the load controller 115 (or, in some aspects, directly to the load device 116). Current can be provided from the power source via a wire 204 or other suitable conductor. Current can be returned to the power source via a wire 206 or other suitable conductor. In some aspects (as depicted in FIG. 3), a wire 204 can be used to provide current to the load device 116 (either directly or via a load controller 115) and current return can be provided via a neutral wire, such as the wire 206. The high-power module 114 can include an electrical coupling 208 between the high-power interface 105 and wire 204 and an electrical coupling 210 between the high-power interface 105 and wire 206. Current can be provided to the high-power interface 105 of the multi-mode control device 102 via the electrical coupling 208. Current can be returned from the high-power interface 105 via the electrical coupling 210. In some aspects, one or more of the electrical couplings 208, 210 can be direct connections (e.g., via wires or other conductors). In additional or alternative aspects, one or more of the electrical couplings 208, 210 can be inductive couplings (e.g., via a transformer).

As depicted in FIG. 3, the low-power module 112 can include current limiting circuitry 212 and a connection 213 to earth ground. The current limiting circuitry 212 can include one or more components (such as, but not limited to, transformers) for reducing an amount of current from the power source 202 that is leaked to earth ground. The reduced amount of current is provided to the multi-mode control device 102 via the low-power interface 104. The current is leaked to earth ground via an electrical connection between low-power interface 104 and the connection 213 to earth ground.

Figure 4:
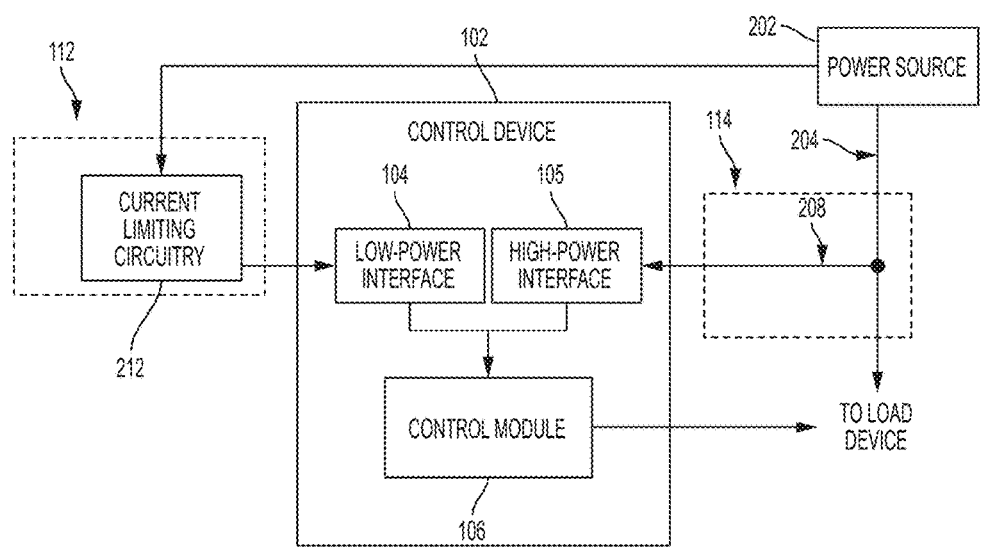
FIG. 4 is a block diagram illustrating an example of the multi-mode control device of FIG. 1 or 2 without a connection to ground and without a connection to neutral according to some aspects.

Although FIG. 3 depicts the use of a connection 213 to ground and a current return that is provided via a neutral wire (e.g., the wire 206), other implementations are possible. For example, FIG. 4 is a block diagram illustrating an example of the multi-mode control device 102 without a connection to ground and without a connection to neutral. The implementation depicted in FIG. 4 may be used, for example, if the power source 202 is not a line voltage. Examples of the power source 202 that may be used in FIG. 4 include a battery or other source of DC power, or any other power source that may not require a connection to ground or neutral. In this example, the low-power interface 104 and the high-power interface 112 are electrically coupled to the power source 202. The multi-mode control device 102 as implemented in FIG. 4 can otherwise be used as described herein with respect to FIG. 3.

Figure 5:
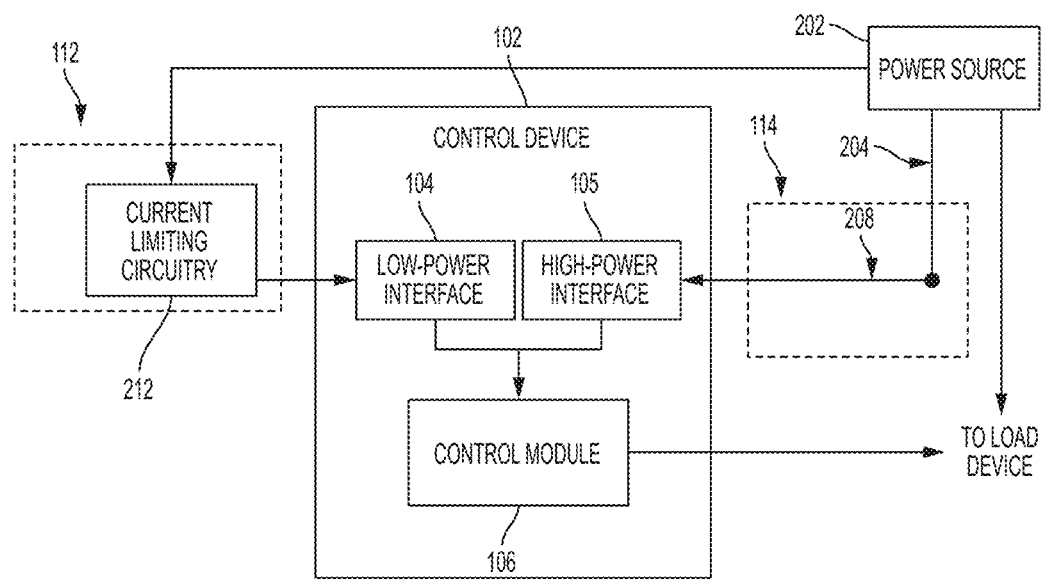
FIG. 5 is a block diagram illustrating an example of the multi-mode control device of FIG. 1 or 2 in which a power source powers the load device independently of powering the control device according to some aspects.

Although FIGS. 3 and 4 depict the use of an electrical coupling 208 to a connection between the power source 202 and the load device, other implementations are possible. For example, FIG. 5 is a block diagram illustrating an example of the multi-mode control device 102 in which the power source 202 powers the load device independently of powering the control device 102. Powering the load device independently of powering the control device 102 can allow the control device 102 to use a different voltage, a different current, a different frequency, or some combination thereof as compared to the load device. The power source 202 can have two separate outputs, one of which is coupled to the control device 102 and one of which is coupled to load device. In this example, the control module 106 can digitally communicate with the load device or an intermediary device that controls the load device (e.g., a secondary control device between the control device 102 and the load device). The multi-mode control device 102 as implemented in FIG. 5 can otherwise be used or implemented as described herein with respect to FIG. 3, FIG. 4, or some combination thereof.

Figure 6:
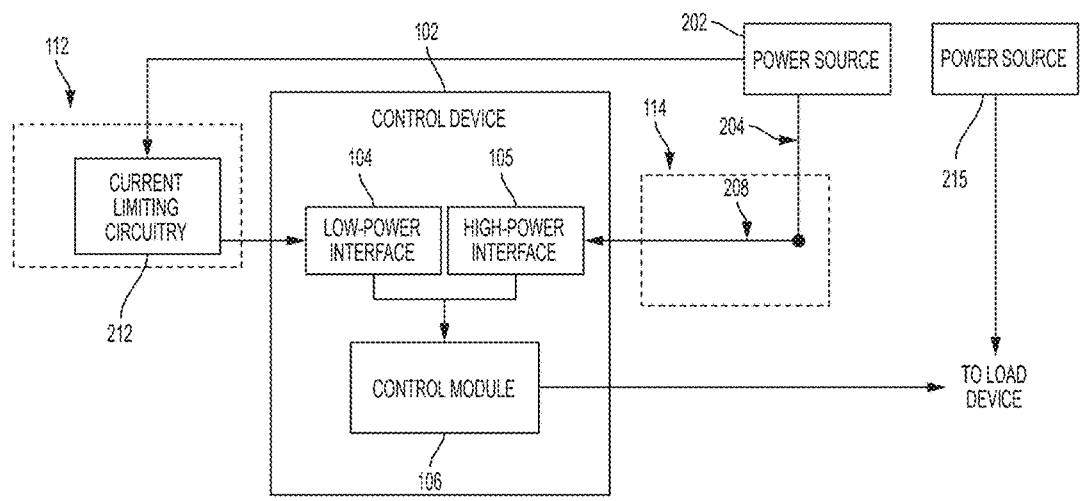
FIG. 6 is a block diagram illustrating an example of the multi-mode control device of FIG. 1 or 2 in which a power source powers the control device and a separate, independent power source is used to power the load device according to some aspects.

Although FIGS. 3-5 depict the use of a single power source 202, other implementations are possible. For example, FIG. 6 is a block diagram illustrating an example of the multi-mode control device 102 in which the power source 202 powers the control device 102 and a separate, independent power source 215 is used to power the load device. The power source 202 may be, for example, a low-voltage power source. Powering the load device independently of powering the control device 102 can allow the control device 102 to use a different voltage, a different current, a different frequency, or some combination thereof as compared to the load device. In this example, the control module 106 can digitally communicate with the load device or an intermediary device that controls the load device (e.g., a secondary control device between the control device 102 and the load device). The multi-mode control device 102 as implemented in FIG. 6 can otherwise be used or implemented as described herein with respect to any of FIGS. 3-5, or some combination thereof.

Figure 7:
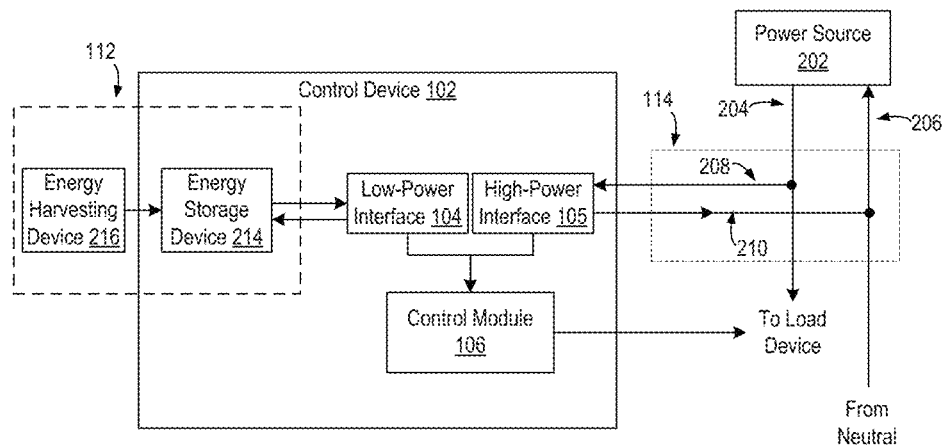
FIG. 7 is a block diagram illustrating an example of the multi-mode control device of FIG. 1 or 2 using one or more of an energy storage device and an energy harvesting device as a power source for a low-power mode according to some aspects.

In additional or alternative aspects, the multi-mode control device 102 can be powered using one or more of an energy storage device and an energy harvesting device. FIG. 7 is a block diagram illustrating an example of the multi-mode control device 102 using an energy storage device 214 as a power source for a low-power mode. Non-limiting examples of an energy storage device 214 include a replaceable battery, a rechargeable battery, a capacitor, etc. The multi-mode control device 102 can be powered by the energy storage device 214 via the low-power interface 104.

In some aspects, an energy harvesting device 216 can be electrically coupled to the energy storage device 214, as depicted in FIG. 7. Non-limiting examples of an energy harvesting device 216 include a light harvesting device, a device configured to convert kinetic energy into electrical energy, etc.

Although FIG. 7 depicts an implementation in which both an energy storage device 214 and an energy harvesting device 216 are used to power the multi-mode control device 102, other implementations are possible. For example, in some aspects, the energy storage device 214 may be omitted and the energy harvesting device 216 can be directly coupled to the low-power interface 104. In other aspects, the energy harvesting device 216 may be omitted and the energy storage device 214 can be used to power the multi-mode control device 102 via the low-power interface 104.

In some aspects, the low-power interface 104 and high-power interface 105 can include electrically isolated circuitry that powers the low-power circuitry 110 and the high-power circuitry 108. For example, FIG. 8 is a block diagram illustrating an example of the multi-mode control device 102 in which the power routing circuitry 103 includes parallel electrical circuitry 300, 301 for powering the low-power circuitry 110 and the high-power circuitry 108.

Figure 8:
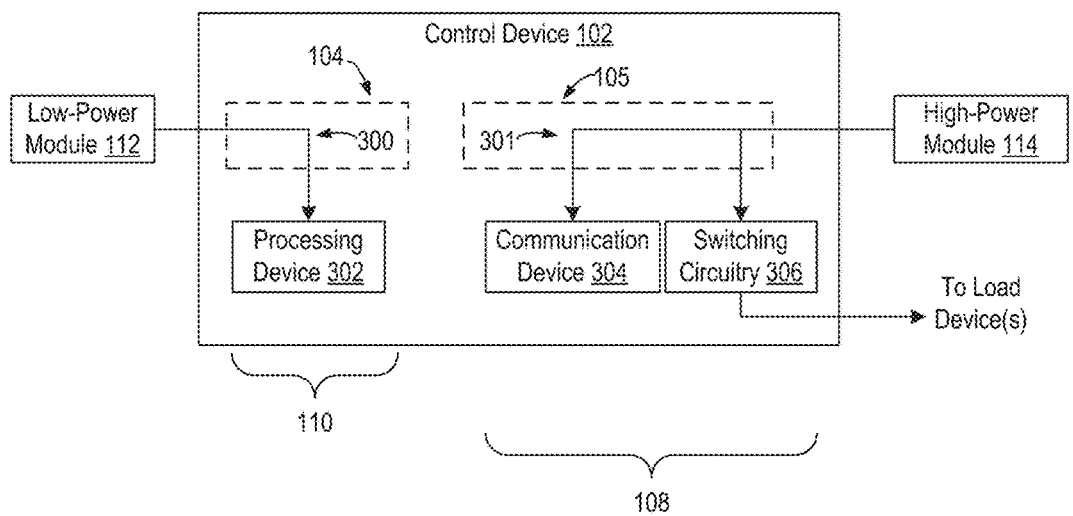
FIG. 8 is a block diagram illustrating an example of the multi-mode control device of FIG. 1 or 2 in which power routing circuitry includes parallel electrical circuitry for powering low-power circuitry and high-power circuitry according to some aspects.

In the example depicted in FIG. 8, the high-power circuitry 108 includes a communication device 304, and switching circuitry 306 (e.g., a relay), and the low-power circuitry 110 includes a processing device 302. In the high-power mode, both the high-power circuitry 108 and the low-power circuitry 110 can be powered. In the low-power mode, the low-power circuitry 110 can be powered and the high-power circuitry can be unpowered. For example, current can be provided to the processing device 302 via the circuitry 300 that is electrically connected to the low-power module 112. For example, the low-power module 112 can be used to power the processing device 302 using leakage current to earth ground, as depicted in FIG. 3 above. Current can be provided to the communication device 304 and the switching circuitry 306 via the circuitry 301 that is electrically connected to the high-power module 114. For example, the high-power module 114 can be used to power the communication device 304 and the switching circuitry 306 using current that is harvested or otherwise obtained from power that is provided from the power source 202 to one or more load devices via the high-power module 114, as described above with respect to FIGS. 7 and 8. The circuitry 300, 301 can be electrically isolated from one another.

The processing device 302 can include any suitable device or group of devices configured to execute code stored on a computer-readable medium. Examples of processing device 302 include a microprocessor, a mixed signal microcontroller, an application-specific integrated circuit ("ASIC"), a field-programmable gate array ("FPGA"), or another suitable processing device.

The communication device 304 can include a device that is configured to communicate signals via a wired or wireless communication link. Examples of the communication device 304 include a radio transceiver, a radio transmitter, a radio receiver, etc. In some aspects, the communication device 304 may communicate with remote sensors (not depicted) such as (but not limited to) a wireless occupancy sensor, a light sensor, etc.

The switching circuitry 306 can include one or more components that can be used by the multi-mode control device 102 for changing the state of a load controller 115 or a load device 116. For illustrative purposes, FIG. 8 and other figures depict switching circuitry 306 as being included in the multi-mode control device 102. For example, the switching circuitry 306 may include a relay that does not require power when the load device 116 is not energized and that is integrated with the multi-mode control device 102. However, other implementations are possible. For example, the switching circuitry 306 may include one or more components of a load controller 115 that are external to the multi-mode control device 102, as depicted in FIG. 1.

Figure 9:
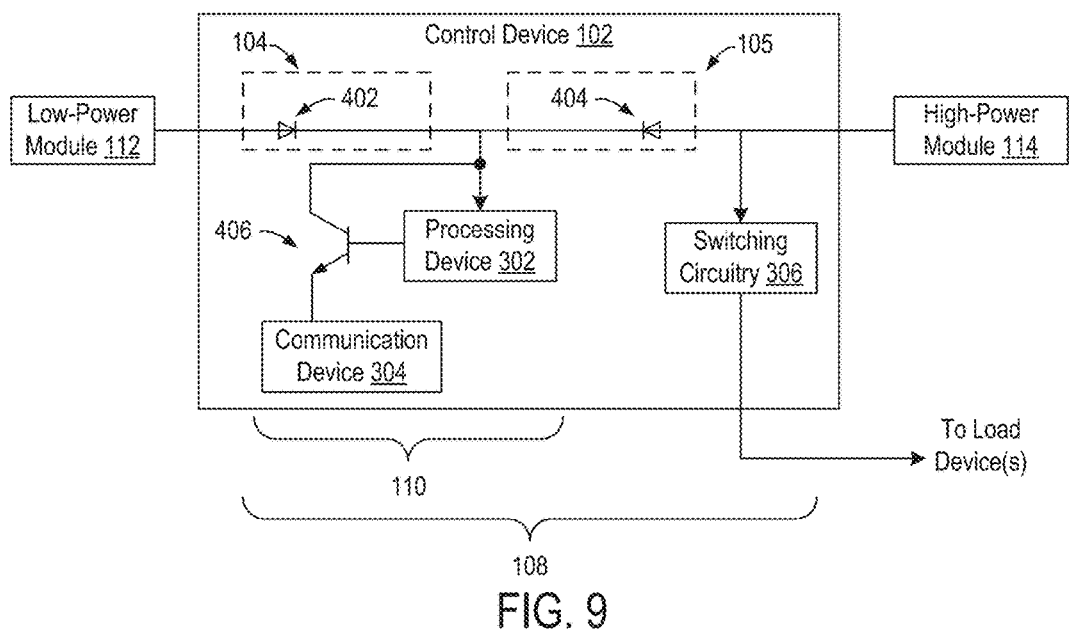
FIG. 9 is a partial block diagram illustrating an alternative example of the multi-mode control device of FIG. 1 or 2 in which power routing circuitry includes multiple diodes for providing power to low-power circuitry and high-power circuitry in different power modes according to some aspects.

FIG. 9 is a partial block diagram illustrating an alternative example of the multi-mode control device 102 in which the power routing circuitry 103 includes multiple diodes 402, 404 for providing power to high-power circuitry 108 and the low-power circuitry 110. The low-power interface 104 can include the diode 402. The high-power interface 105 can include the diode 404. In some aspects, the high-power interface 105 can include one or more electrical connections to high-power circuitry 108 that is not powered in the low-powered mode, such as (but not limited to) switching circuitry 306. The electrical connections to high-power circuitry 108 that is not powered in the low-powered mode can be connected to a circuit path between the high-power module 114 and an anode of the diode 402.

An output of the low-power module 112 can be electrically coupled to the anode of a diode 402. An input of the processing device 302 or other low-power circuitry 110 can be electrically coupled to the cathode of the diode 402. The diode 402 can prevent at least some of the current received via the high-power interface 105 from flowing to the low-power module 112. For example, the low-power module 112 may allow the multi-mode control device 102 to be powered by leaking current through to earth ground, as described above with respect to FIG. 3. The diode 402 may prevent or reduce the leakage to earth ground of current that is provided to the load device 116 via the high-power module 114 when the multi-mode control device 102 is in the high-power mode.

An output of the high-power module 114 can be electrically coupled to the anode of the diode 404. An input of the processing device 302 or other low-power circuitry 110 can be electrically coupled to the cathode of the diode 404. The diode 404 can prevent current from being provided to components of the multi-mode control device 102 other than the low-power circuitry 110. For example, the diode 404 can prevent at least some of the current that flows through diode 402 from flowing toward the high-power module 114 or the high-power circuitry. For example, the low-power module 112 may allow the multi-mode control device 102 to be powered by a battery or other energy storage device having a finite energy supply. The diode 404 can prevent current from such alternative power sources from being siphoned away from the processing device 302 or the communication device 304.

In the example depicted in FIG. 9, the low-power circuitry 110 includes the processing device 302 and the communication device 304. In some aspects, the communication device 304 can require significant power for operation. For example, operating the communication device 304 continuously may quickly exhaust power that is available via the low-power module 112 when the load device 116 is not powered. The communication device 304 may be disabled during at least some portion of time in which the multi-mode control device 102 is in a low-power mode. In one example, the communication device 304 may be enabled for short periods of time during the low-power mode. For example, the processing device 302 can enable the communication device 304 by providing a current via an output of the processing device 302 to a base of a transistor 406. Providing a current to the base of the transistor 406 can allow current to flow from the low-power module 112 through the transistor 406 to the communication device 304.

In some aspects, the processing device 302 can operate at a full power or at other operational modes during periods of time when the multi-mode control device 102 is in a high-power mode. The processing device 302 can operate in a "sleep" or other low-power mode during at least some periods of time when the multi-mode control device 102 is in a low-power mode. For example, the processing device 302 may operate in different modes in implementations in which the low-power module 112 includes an energy storage device 214 having a finite supply of energy. An internal timing device can be used to activate the processing device 302 for switching the processing device 302 from a "sleep" or other lower power mode to a full power or other operational mode. Non-limiting examples of an internal timing device can include a watch crystal oscillator, an internal very-low-power low-frequency oscillator, and an internal digitally controlled oscillator.

In some aspects, the processing device 302 or one or more other suitable components of the control module 106 can be used to switch the multi-mode control device 102 to the low-power mode in which the multi-mode control device 102 is powered using the low-power module 112. For instance, FIG. 10 is a partial block diagram illustrating an alternative example of the multi-mode control device 102 in which the low-power interface 104 includes a transistor 502 or other suitable switching component that is used for providing power to the low-power circuitry 110.

The processing device 302 can configure the transistor 502 or other suitable switching component to allow current flow to the low-power circuitry 110 based on a reading from sensing circuitry 508. The sensing circuitry 508 can be electrically coupled to an input pin or other input port of the processing device 302. The processing device 302 can determine, based on a value sampled from the input pin or other input port, that the low-power circuitry 110 is to be powered using the low-power module 112. The processing device 302 can respond to the determination by providing, via an output pin or other output port of the processing device 302, a current to a base of the transistor 502. Providing a current to the base of the transistor 502 can allow current to flow from the low-power module 112 through the transistor 502 to the low-power circuitry 110.

Figure 10:
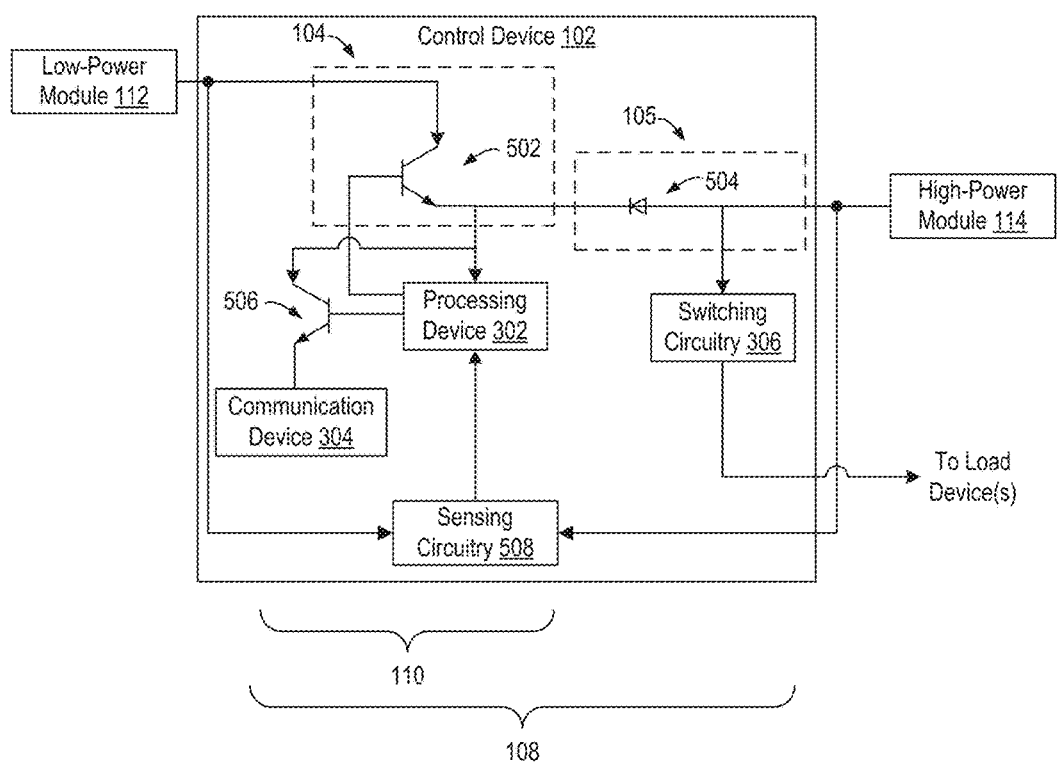
FIG. 10 is a partial block diagram illustrating an alternative example of the multi-mode control device of FIG. 1 or 2 in which power routing circuitry includes a transistor or other switching component that is used for providing power to low-power circuitry based on a reading from sensing circuitry according to some aspects.

In some aspects, the sensing circuitry 508 can be electrically coupled to one or both of the low-power module 112 and the high-power module 114, as depicted in FIG. 10. The sensing circuitry 508 can include one or more components that can be used to compare a first amount of current or voltage associated with the low-power module 112 with a second amount of current or voltage associated with the high-power module 114. For example, a differential amplifier or other comparator can include a first input that is electrically coupled to the low-power module 112, a second input that is electrically coupled to the high-power module 114, and an output that is electrically coupled to an input pin or other input port of the processing device 302. The processing device 302 can sample the current or voltage at the output of the sensing circuitry 508. If the current or voltage at the first input is greater than the current or voltage at the second input (i.e., if the current used to energize the load has significantly decreased), a current or voltage at the output of the comparator can change. The processing device 302 can respond to the change in current or voltage by enabling the low-power module 112 to provide current to the processing device 302 (i.e., by switching on the transistor 506). At a subsequent point in time, if the current or voltage at the first input is less than the current or voltage at the second input (i.e., if the load current has significantly increased), a current or voltage at the output of the comparator can change again. The processing device 302 can respond to the additional change in current or voltage by preventing the low-power module 112 from providing current to the processing device 302 (i.e., by switching off the transistor 506).

Although FIG. 10 depicts the sensing circuitry 508 as being electrically coupled to both the low-power module 112 and the high-power module 114, other implementations are possible. For example, the sensing circuitry 508 may include a current sense resistor in an electrical path from the high-power module 114 to an input pin or other input port of the processing device 302. The processing device 302 can sample the current or voltage at the input pin or other input port. The processing device 302 can switch on the transistor 506 in response to the sampled current or voltage failing to exceed a threshold current or voltage (e.g., when the load device 116 is powered off). The processing device 302 can switch off the transistor 506 in response to the sampled current or voltage exceeding a threshold current or voltage (e.g., when the load device 116 is powered on or otherwise energized).

In the example depicted in FIG. 10, the low-power circuitry 110 includes the processing device 302 and the communication device 304. The diode 504 can prevent current that flows through the low-power module 112 from also flowing to the high-power module 114. The diode 504 can thereby prevent current from being provided to components of the multi-mode control device 102 other than the low-power circuitry 110. The communication device 304 may be disabled during at least some portion of time in which the multi-mode control device 102 is in a low-power mode. For example, the processing device 302 can enable the communication device 304 by providing a current via an output of the processing device 302 to a base of a transistor 506. Providing a current to the base of the transistor 506 can allow current to flow from the low-power module 112 through the transistor 506 to the communication device 304.

Figure 11:
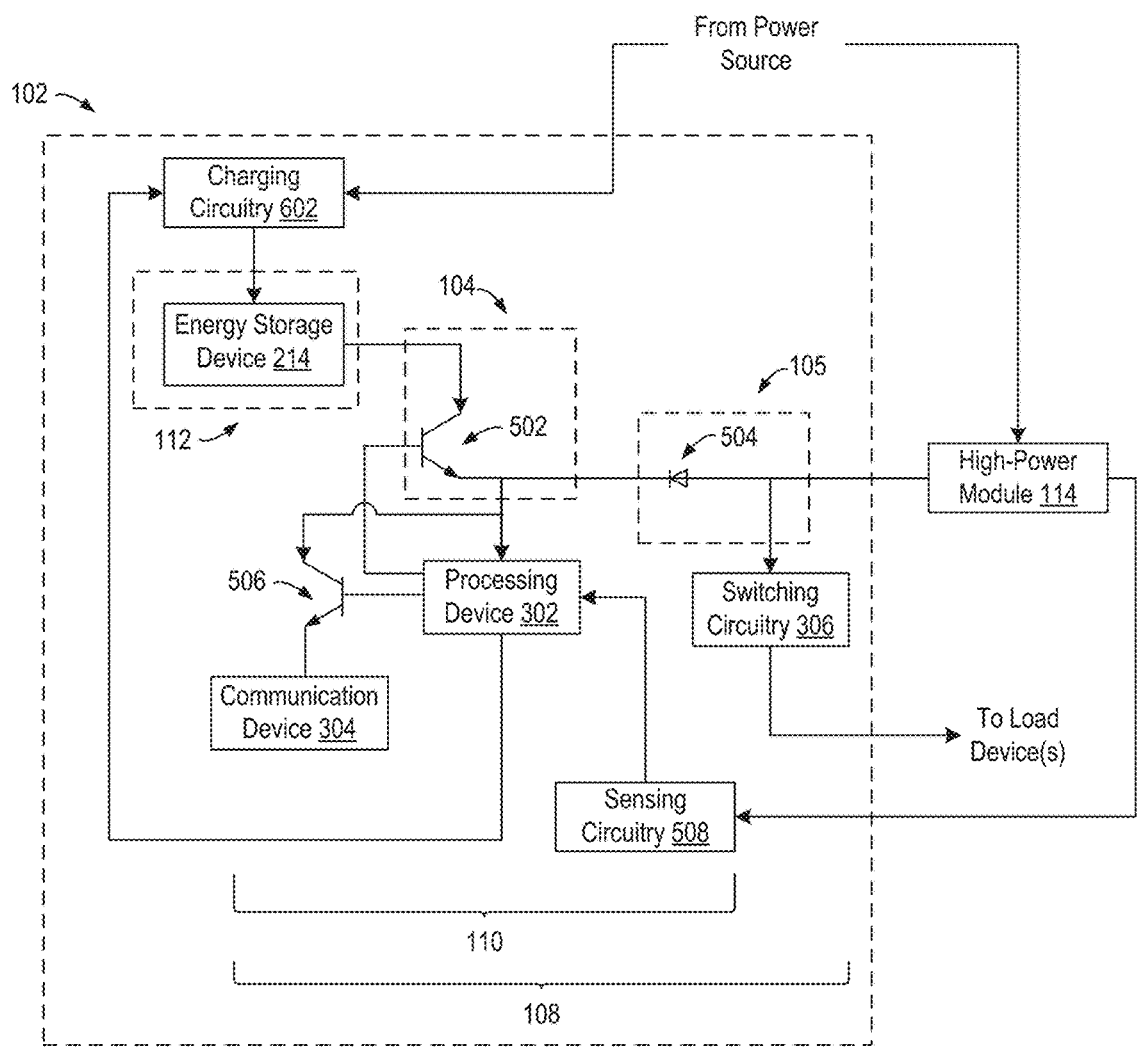
FIG. 11 is a partial block diagram illustrating an alternative example of the multi-mode control device of FIG. 1 or 2 in which an energy storage device for providing power to low-power circuitry is configured to store energy when the multi-mode control device is in a high-power mode according to some aspects.

In some aspects, the processing device 302 can be used to control the charging of an energy storage device (e.g., a battery or capacitor) that is included in or electrically coupled to the low-power module 112. For example, FIG. 11 is a partial block diagram illustrating an alternative example of the multi-mode control device 102 in which an energy storage device 214 for providing power to the low-power circuitry 110 is configured to store energy when the multi-mode control device 102 is in a high-power mode. The processing device 302 can determine from the sensing circuitry 508 that the load device 116 is powered on, as described above with respect to FIG. 10. The processing device 302 can respond to determining that the load device 116 is powered on by configuring the charging circuitry 602 to allow power from the power source 202 to charge the energy storage device 214. For example, the charging circuitry 602 can include one or more transistors in an electrical path between the power source 202 and the energy storage device 214. The processing device 302 can configure the charging circuitry 602 to allow a charging current from the power source 202 to charge the energy storage device 214 by providing a current to the base of one or more transistors in the charging circuitry 602.

Figure 12:
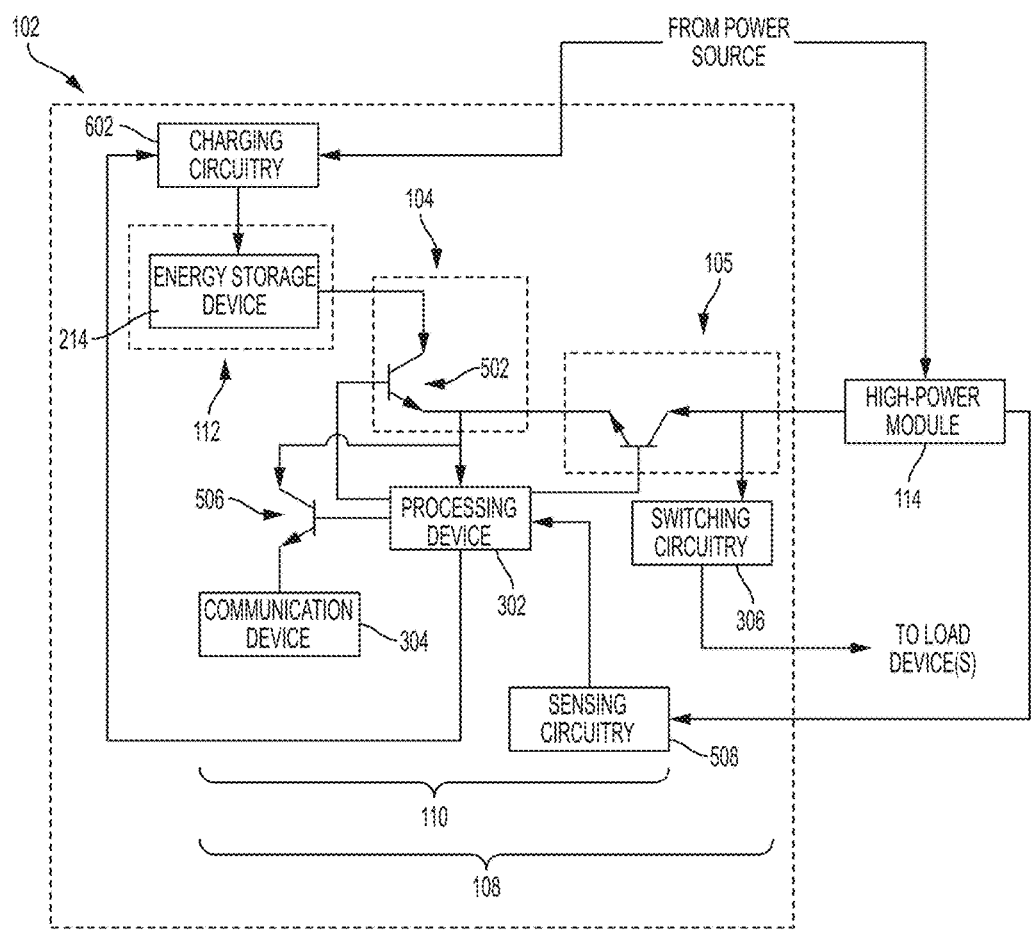
FIG. 12 is a partial block diagram illustrating an alternative example of the multi-mode control device of FIGS. 1 and 2 in which a transistor is used to implement the high-power interface according to some aspects.

In some aspects, the multi-mode control device 102 can with a high-power interface 105 other than a diode 504. For example, FIG. 12 is a partial block diagram illustrating an alternative example of the multi-mode control device 102 in which a transistor 117 is used to implement the high-power interface 105. The processing device 302 can use the transistor 117 to decouple one or more components of the multi-mode control device 102 from the high-power module 114. For example, it may be desirable to place the multi-mode control device 102 in a power-saving mode of operation. The processing device 302 can place the multi-mode control device 102 in the power-saving mode by deactivating the transistor 117, thereby preventing current that is obtained using the high-power module 114 from being provided to certain circuitry or components of the multi-mode control device 102 (e.g., the communication device 304). In the power-saving mode, power from the energy storage device 214 can be used to power one or more components of the multi-mode control device 102 (e.g., the processing device 302).

The transistor 117 can also prevent current that flows through the low-power module 112 from also flowing to the high-power module 114. The transistor 117 can thereby prevent current from being provided to components of the multi-mode control device 102 other than the low-power circuitry 110.

The processing device 302 can decouple one or more components of the multi-mode control device 102 from the high-power module 114 for any suitable reason. For example, if the sensing circuitry 508 does not sense an occupant or other trigger for a certain period of time, a load device (e.g., a lighting device) may first be deactivated. After an additional period of time without the sensing circuitry 508 sensing an occupant or other trigger, the processing device 302 can use the transistor 117 to place the multi-mode control device 102 into a low-power mode. If the sensing circuitry 508 detects an occupant or other trigger, the processing device 302 can place the multi-mode control device 102, and the load device can be activated.

Figure 13:
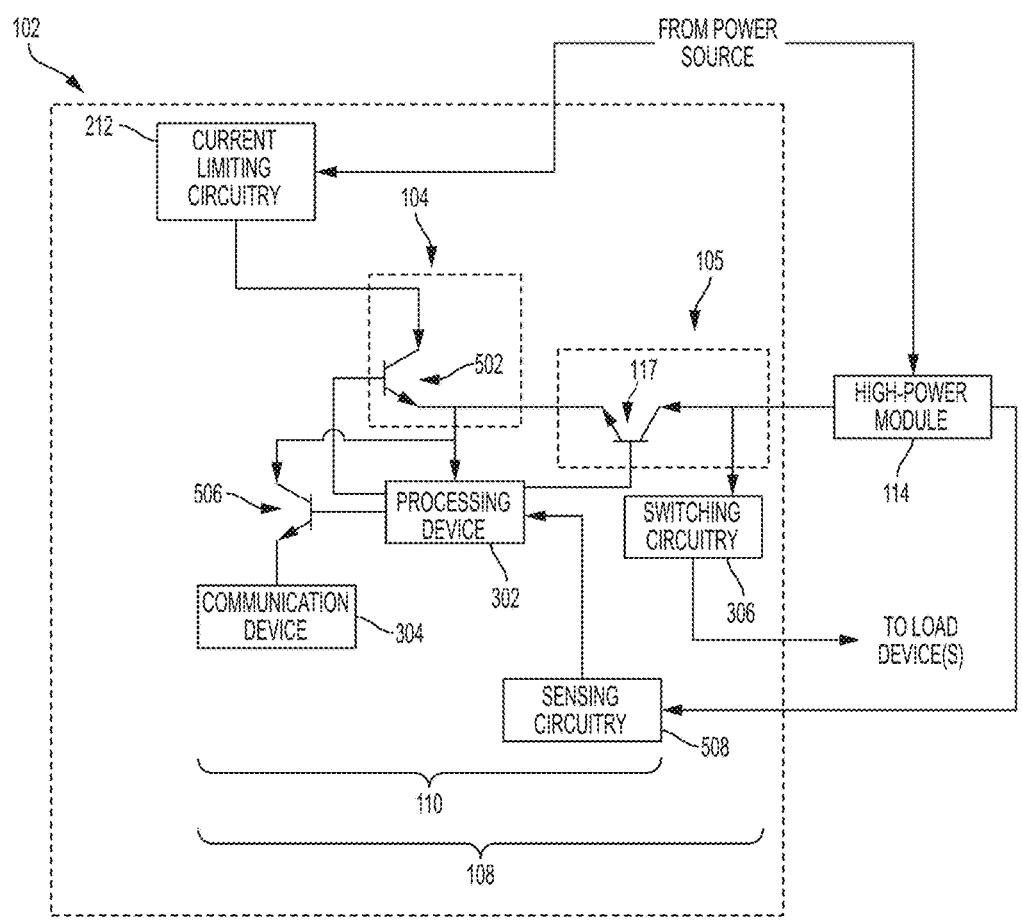
FIG. 13 is a partial block diagram illustrating an alternative example of the multi-mode control device of FIGS. 1 and 2 in which a transistor is used to implement the high-power interface and current limiting circuitry is used in place of an energy storage device and charging circuitry, according to some aspects.

In additional or alternative aspects, the energy storage device 214 and charging circuitry 602 can be omitted. For example, FIG. 13 is a partial block diagram illustrating an alternative example of the multi-mode control device 102 in which a transistor 117 is used to implement the high-power interface 105 and current limiting circuitry 212 is used in place of an energy storage device and charging circuitry. As described above with respect to FIG. 3, the current limiting circuitry 212 can include one or more components (such as, but not limited to, transformers) for reducing an amount of current from the power source 202 that is leaked to earth ground. The reduced amount of current is provided to the multi-mode control device 102 via the low-power interface 104. The current is leaked to earth ground via an electrical connection between low-power interface 104 and a connection to earth ground. The processing device 302 can use the transistor 117 in the same manner as described above with respect to FIG. 12.

In some aspects, the high-power circuitry 108 can include high-power sensing circuitry or components, such as (but not limited to) an occupancy sensor, a motion sensor, a proximity sensor, a video camera or image sensor, a network activity monitor, an RF radio, a vibration or position sensor, or any other type of suitable sensor device or group of devices. In the high-power mode, the control device 102 can operate the occupancy sensor or other high-power sensing circuitry. The occupancy sensor or other high-power sensing circuitry can be used to determine whether the control device 102 is to remain in the high-power mode. In the low-power mode, the control device 102 can use a trigger from a trigger detection device to determine whether to change the control device 102 from the low-power mode to the high-power mode. Examples of triggers received by trigger detection devices include (but are not limited to) a button press or other touch received by a button or touch sensor, RF energy received by an antenna, infrared energy received by a passive infrared sensor, infrared signals received by an infrared receiver by a remote infrared transmitter, vibrations received by a vibration sensor, sounds detected by a sound sensor, changes in temperature or other environmental conditions detected by an appropriate sensor, changes in light detected by a photocell or other sensor for sensing visible light, messages received by a network interface device, etc.

Figure 14:
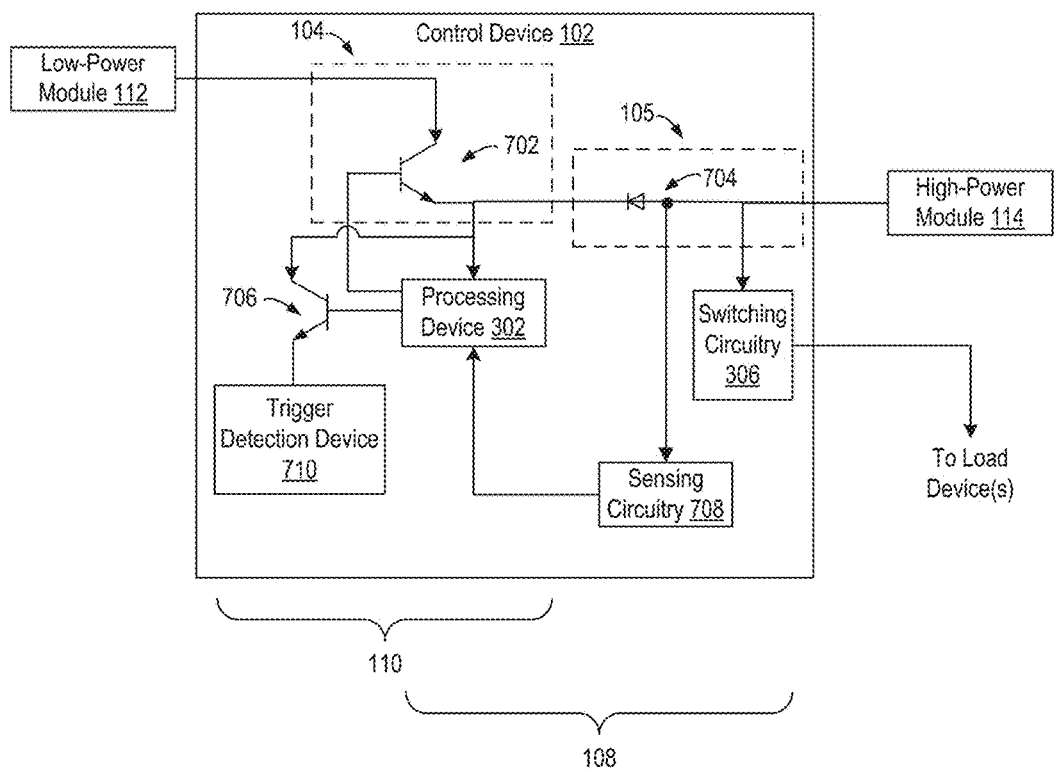
FIG. 14 is a partial block diagram illustrating an alternative example of the multi-mode control device of FIG. 1 or 2 that includes high-power sensing circuitry and a trigger detection device according to some aspects.

For instance, FIG. 14 is a partial block diagram illustrating an alternative example of the multi-mode control device 102 that includes high-power sensing circuitry 708 and a trigger detection device 710. Examples of the sensing circuitry 708 include an occupancy sensor, a motion sensor, a proximity sensor, a video camera or image sensor, a network activity monitor, an RF radio, a vibration or position sensor, or any other type of suitable sensor device or group of devices. Examples of the trigger detection device 710 include (but are not limited to) a button, a touch sensor, an antenna for receiving RF energy, a passive infrared sensor, an infrared receiver, a vibration sensor, a sound sensor, a temperature sensor, a heat sensor, a photocell or other sensor for sensing visible light, a network interface device, etc.

The sensing circuitry 708 can be powered by current received via the high-power interface 105. The high-power interface 105 depicted in FIG. 10 can include, for example, a diode 704 and circuitry for electrically coupling the high-power module 114 to the sensing circuitry 708 and the switching circuitry 306 via one or more electrical paths. The diode 704 can perform a similar function as the diode 404 described above with respect to FIG. 9 or the diode 504 described above with respect to FIG. 10. Although the example of a high-power interface 105 depicted in FIG. 14 includes a diode 704, other implementations of a high-power interface 105 can be used for a control device 102 that includes high-power sensing circuitry 708.

Although FIG. 14 depicts a high-power interface 105 implemented using a diode 704, other implementations are possible. For example, one or more aspects of FIG. 14 can be combined with one or more aspects of FIG. 12, FIG. 13, or both. In some aspects, the diode 704 may be replaced with a transistor 117. The processing device 302 can use the transistor 117 to control current flow from the power 202 toward circuitry or components of the control device 102.

The trigger detection device 710 can be powered by current received via the low-power interface 104. The low-power interface 104 depicted in FIG. 10 can include, for example, a transistor 702 or other suitable switching component. The transistor 702 or other suitable switching component can perform a similar function as the transistor 502 described above with respect to FIG. 10.

The processing device 302 can configure the transistor 702 or other suitable switching component to allow current flow to the low-power circuitry 110 based on the processing device 302 determining that the control device 102 is in the low-power mode or is to enter the low-power mode.

In some aspects, the processing device 302 can determine that the control device 102 is in the low-power mode or is to enter the low-power mode based on information received from the sensing circuitry 708. For example, sensing circuitry 708 such as an occupancy sensor, a motion sensor, a proximity sensor, a video camera or image sensor, a network activity monitor, an RF radio, a vibration or position sensor, or any other type of suitable sensor device or group of devices can be electrically coupled to an input pin or other input port of the processing device 302. The processing device 302 can determine, based on a value sampled from the input pin or other input port, that the trigger detection device 710 and/or other the low-power circuitry 110 is to be powered using the low-power module 112. The processing device 302 can respond to the determination by providing, via an output pin or other output port of the processing device 302, a current to a base of the transistor 706. Providing a current to the base of the transistor 706 can allow current to flow from the low-power module 112 through the transistor 706 to the trigger detection device 710 or other low-power circuitry 110.

In additional or alternative aspects, the processing device 302 can determine that the control device 102 is in the low-power mode or is to enter the low-power mode based on information received from other sensing circuitry used to monitor current or power provided to the load device 116, such as the sensing circuitry 508 depicted in FIGS. 10-13. In some aspects, the control device 102 can include a trigger detection device 710 and both sensing circuitry used to monitor current or power provided to the load device 116 (as depicted in FIGS. 10-13) and high-power sensing circuitry 708 such as an occupancy sensor, a motion sensor, a proximity sensor, a video camera or image sensor, a network activity monitor, an RF radio, a vibration or position sensor, or any other type of suitable sensor device or group of devices. In other aspects, the control device 102 can include a trigger detection device 710 and sensing circuitry used to monitor current or power provided to the load device 116 (as depicted in FIGS. 10-13), and an occupancy sensor or other high-power sensing circuitry 708 can be omitted.

In some aspects, the sensing circuitry 508 can be electrically coupled to one or both of the low-power module 112 and the high-power module 114, as depicted in FIG. 14. The sensing circuitry 508 can include one or more components that can be used to compare a first amount of current or voltage associated with the low-power module 112 with a second amount of current or voltage associated with the high-power module 114. For example, a differential amplifier or other comparator can include a first input that is electrically coupled to the low-power module 112, a second input that is electrically coupled to the high-power module 114, and an output that is electrically coupled to an input pin or other input port of the processing device 302. The processing device 302 can sample the current or voltage at the output of the sensing circuitry 508. If the current or voltage at the first input is greater than the current or voltage at the second input (i.e., if the current used to energize the load has significantly decreased), a current or voltage at the output of the comparator can change. The processing device 302 can respond to the change in current or voltage by enabling the low-power module 112 to provide current to the processing device 302 (i.e., by switching on the transistor 506). At a subsequent point in time, if the current or voltage at the first input is less than the current or voltage at the second input (i.e., if the load current has significantly increased), a current or voltage at the output of the comparator can change again. The processing device 302 can respond to the additional change in current or voltage by preventing the low-power module 112 from providing current to the processing device 302 (i.e., by switching off the transistor 506).

Figure 15:
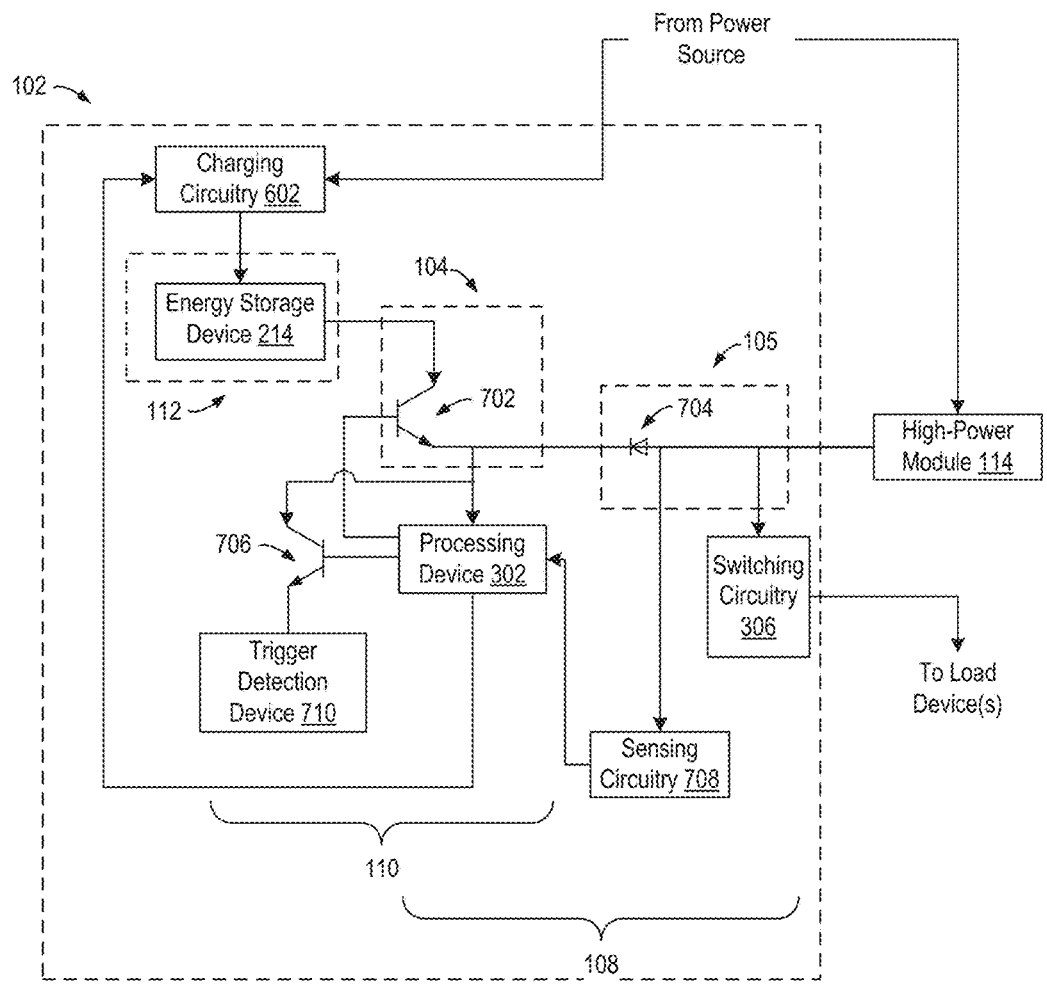
FIG. 15 is a partial block diagram illustrating an alternative example of the multi-mode control device of FIG. 1 or 2 that includes high-power sensing circuitry and a trigger detection device, where an energy storage device for providing power to low-power circuitry is configured to store energy when the multi-mode control device is in a high-power mode according to some aspects.

In additional or alternative aspects, the control device 102 having a trigger detection device 710 and high-power sensing circuitry 708 can also include the charging circuitry 602 and energy storage device 214, as depicted in FIG. 15. The charging circuitry 602 and energy storage device 214 can be operated in a manner similar to that described above with respect to FIG. 11.

Although FIGS. 14 and 15 omit a communication device 304 for simplicity of illustration, a control device 102 can be implemented using any combination of components depicted in FIGS. 1-15. For example, a control device 102 can include a processing device 302 having an output pin electrically coupled to a transistor or other switching component for operating a communication device 304 in a low-power mode or high-power mode, and the control device 102 can also include an additional output pin electrically coupled to a transistor or other switching component for operating a trigger detection device 710 in a low-power mode or high-power mode. In some aspects, the communication device 304 can be used as a trigger detection device 710 (e.g., for receiving a message indicating that the control device 102 is to be operated in a high-power mode).

Power Control Schemes Using Multi-Mode Control Device

In some aspects, the multi-mode control device 102 can be used to implement a power control scheme in which an occupancy sensor, a communication device, or another high-power receiving device (e.g., a motion sensor, a proximity sensor, a video camera or image sensor, a network activity monitor, an RF radio, a vibration or position sensor, or any other type of suitable sensor device or group of devices) can be operated in the high-power mode, and a low-power sensor or other suitable trigger detection device can be used in the low-power mode to determine whether to switch the control device 102 to the high-power mode.

Figure 16:
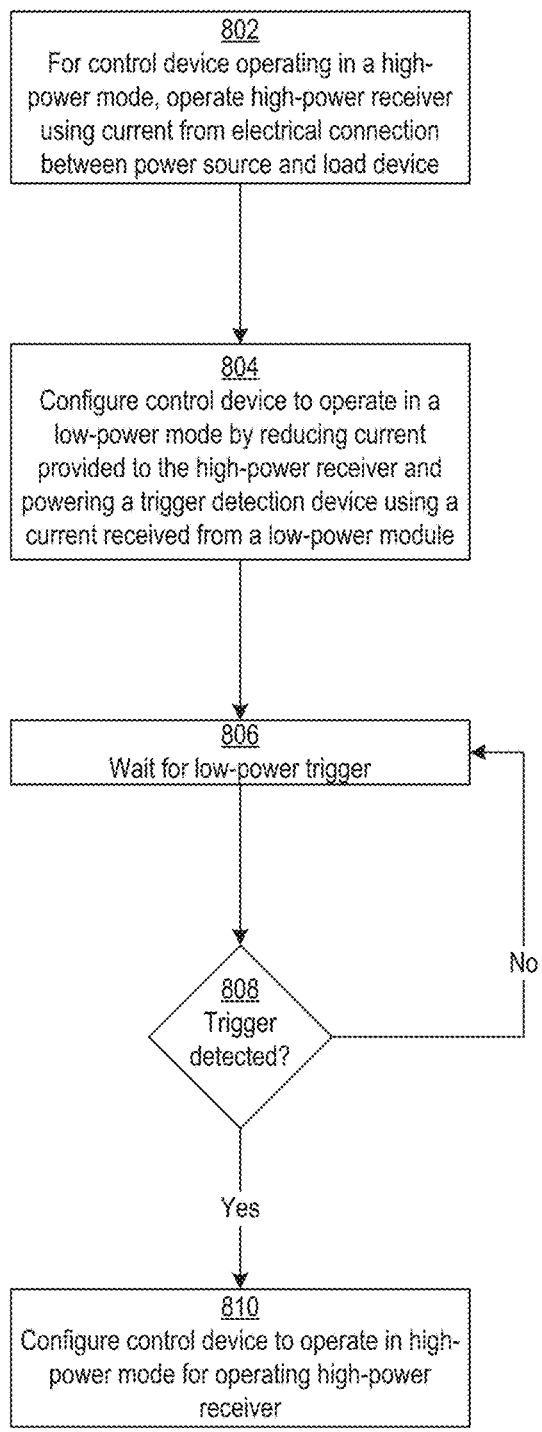
FIG. 16 is a flow chart depicting an example of a process using a multi-mode control device to implement a power control scheme using a combination of high-power sensing circuitry and a low-power trigger detection device according to some aspects.

For example, FIG. 16 is a flow chart depicting an example of a process 800 using a multi-mode control device 102 to implement a power control scheme using a combination of high-power sensing circuitry and a low-power trigger detection device. The process is described with respect to the implementations described above with respect to FIGS. 1-15. However, other implementations are possible.

At block 802, the process 800 involves powering, based on the control device 102 being in a high-power mode, a high-power receiver using a current from an electrical connection between a power source and a controlled load device 116. The high-power receiver can include any device or group of devices that are powered using a current received from the high-power module 114 via the high-power interface 105. In one example, the high-power receiver can be a communication device 304 that is powered using one or more of the implementations of the control device 102 depicted in FIGS. 9-13. In another example, the high-power receiver can be an occupancy sensor or other high-power sensing circuitry 708 that is powered using one or more of the implementations of the control device 102 depicted in FIGS. 14 and 15. In another example, the high-power receiver can be an occupancy sensor or other high-power sensing circuitry that is powered by using the processing device 302 to actuate a transistor or other switching component to provide an electrical path between the high-power module 114 and the high-power receiver.

At block 804, the process 800 involves configuring the control device 102 to operate in a low-power mode by reducing current provided to the high-power receiver and powering a trigger detection device 710 using a current received from a low-power module.

For example, the control device 102 can power off or otherwise reduce power to the high-power receiver. In some aspects, the processing device 302 can deactivate a transistor or other switching component connecting the high-power receiver to an electrical path in which current flows. In other aspects, the processing device 302 can provide a control signal to the high-power receiver via a data bus of the control device 102 that instructs the high-power receiver to turn off or reduce power consumption. The control device can the load device 116 to reduce or cease its power consumption. In one example, the control device 102 can transmit a signal to a load controller 115 or directly to the load device 116 that causes the load device 116 to change from a powered-on state to a powered-off state. In another example, the control device 102 can configure one or more switching components in an electrical path between the load device 116 and a power source to reduce or prevent current flow to the load device 116.

In some aspects, the control device 102 can power the trigger detection device 710 in the manner described above with respect to FIG. 14. For example, the processing device 302 can activate a transistor or other switching component that provides an electrical path for current to flow from the low-power module 112 to the trigger detection device 710.

At block 806, the process 800 involves waiting for a low-power trigger to be detected, received, or otherwise obtained by the trigger detection device 710. In some aspects, detecting the trigger using the trigger detection device 710 involves detecting a touch via the trigger detection device 710. For example, the trigger detection device 710 can be a touch sensor or a button included in or communicatively coupled to the control device 102. In additional or alternative aspects, detecting the trigger using the trigger detection device 710 involves detecting energy received by the trigger detection device 710. For example, the trigger detection device 710 can be a sensor or other suitable device included in or communicatively coupled to the control device 102 and configured to detect energy such as (but not limited to) RF energy, light energy in a visible spectrum, infrared light energy, and sound waves. In additional or alternative aspects, detecting the trigger using the trigger detection device 710 involves receiving a signal via the trigger detection device 710. In one example, the trigger detection device 710 can be an infrared receiver included in or communicatively coupled to the control device 102 that can communicate with an infrared transmitter (e.g., a remote control used to operate the control device 102). In another example, the trigger detection device 710 can be a network interface device or other communication device 304 included in or communicatively coupled to the control device 102 that can receive data messages. In additional or alternative aspects, detecting the trigger using the trigger detection device 710 involves detecting other environmental changes using the trigger detection device 710. Examples of such environmental changes include changes in temperature, heat flow, vibration, etc.

At block 808, the process 800 involves determining whether a trigger has been detected, received, or otherwise obtained by the trigger detection device 710. If a trigger is not present, the process 800 can return to block 806.

If a trigger is present, the process 800 involves configuring the control device 102 to operate in the high-power mode for operating the occupancy sensor, as depicted at block 810. For example, the control device 102 can cause power consumption by the load device 116 to increase. The control device 102 can transmit a signal to a load controller 115 and/or the load device 116 that causes the load device 116 to enter a powered-on state. Power can be provided to the high-power receiver. The processing device 302 may, for example, activate a transistor or other suitable switching component to allow current to flow to the high-power receiver from the high-power interface 105.

Figure 17:
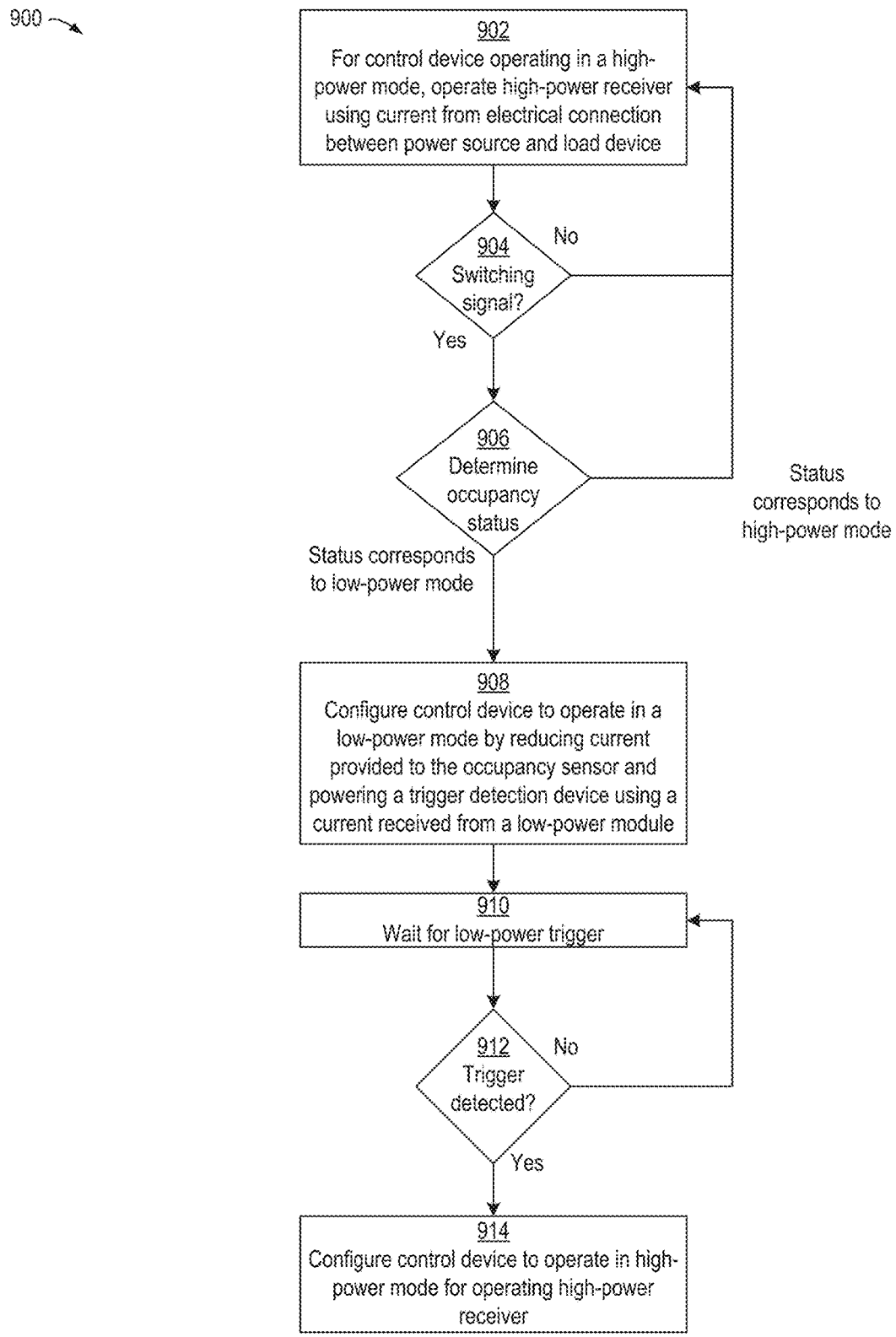
FIG. 17 is a flow chart depicting an example of a process using a multi-mode control device to implement a power control scheme involving an interim power mode using a combination of high-power sensing circuitry and a low-power trigger detection device according to some aspects.

In additional or alternative aspects, the control device 102 can be operated in an interim mode in which the processing device 302 verifies that the control device 102 should switch from the high-power mode to the low-power mode. For example, FIG. 17 is a flow chart depicting an example of a process 900 using a multi-mode control device 102 to implement a power control scheme involving an interim power mode using a combination of high-power sensing circuitry and a low-power trigger detection device. The process is described with respect to the implementations described above with respect to FIGS. 1-15. However, other implementations are possible.

At block 902, the process 900 involves powering, based on the control device 102 being in a high-power mode, a high-power receiver using a current from an electrical connection between a power source and a controlled load device 116. Block 902 can be implemented in a manner similar to that described above with respect to block 802 in FIG. 16.

At block 904, the process 900 involves receiving switching information indicating that the control device 102 is to enter the low-power mode.

In some aspects, switching information can include a signal or other information generated by manually actuating the control device 102. In one example, a button communicatively coupled to the processing device 302 can be pressed. The button press can indicate that the load device 116 is to be powered off or that the control device 102 is to enter a low-power state. In another example, a signal can be received by the communication device 304 from a remote control. The received signal can indicate that the load device 116 is to be powered off or that the control device 102 is to enter a low-power state.

In additional or alternative aspects, switching information can include a signal or other information generated by powering off or otherwise reducing the power provided to the load device 116. For example, the sensing circuitry 508 depicted in FIGS. 10-13 can be used by the processing device 302 to determine that the power provided to the load device 116 has decreased below a threshold amount. The power decreasing by a threshold amount can indicate that the control device 102 should enter a low-power mode.

At block 906, the process 900 involves determining an occupancy status in an area serviced by the load device 116. In an interim mode in which occupancy status is determined, the control device 102 can determine the occupancy status using the high-power receiver. In one example, a high-power receiver such as a communication device 302 can communicate with an occupancy sensor or other high-power sensing circuitry remote from the control device 102 to determine the occupancy status. The processing device 302 can receive one or more messages via the communication device 302 to determine the occupancy status. In another example, a high-power receiver such as an occupancy sensor included in the control device 102 can be used to determine the occupancy status.

The processing device 302 can determine whether the occupancy status corresponds to a condition for entering the low-power mode. For example, the control device 102 can cause the load device 116 to be powered off in response to and immediately after receiving switching information. In a time period subsequent to the control device 102 causing the load device 116 to be powered off or otherwise changing the state of the load device 116, the processing device 302 can cause power to be provided to the high-power receiver for receiving occupancy information. After causing the causing the load device 116 to be powered off or otherwise changing the state of the load device 116, the processing device 302 can start a timer corresponding to the specified time period. If occupancy is sensed during the time period (e.g., before the timer expires), the control device 102 can change the state of the load device 116 (e.g., cause the load device 116 to be powered on) and remain in the high-power mode (i.e., the detected occupancy information is not consistent with entering the low-power mode). If occupancy is not sensed during the time period (e.g., before the timer expires), the multi-mode control device 102 can refrain from changing the state of the load device 116 (e.g., allow the load device to remain powered off) and enter the low-power mode (i.e., the detected occupancy information is consistent with entering the low-power mode). The time period can be determined or otherwise obtained in any suitable manner. In some aspects, the area is monitored for a period of time that is determined or otherwise obtained based on a fixed setting for the time period. In additional or alternative aspects the area is monitored for a period of time that is determined or otherwise obtained based on a user-programmable setting for the time period. In additional or alternative aspects the area is monitored for a period of time that is determined or otherwise obtained based on a programmed setting that is automatically adjusted based on power consumption patterns.

If the occupancy status does not correspond to a condition for entering the low-power mode, the process 900 returns to block 902.

If the occupancy status corresponds to a condition for entering the low-power mode, the process 900 involves configuring the control device 102 to operate in a low-power mode by reducing current provided to the high-power receiver and powering a trigger detection device 710 using a current received from a low-power module, as depicted at block 908. The control device 102 can be switched to the low-power mode based on receiving the switching information at block 904 and determining the occupancy status at block 906. Block 908 can be implemented in a manner similar to that described above with respect to block 804 in FIG. 16.

At block 910, the process 900 involves waiting for a low-power trigger to be detected, received, or otherwise obtained by the trigger detection device 710. Block 910 can be implemented in a manner similar to that described above with respect to block 806 in FIG. 16.

At block 912, the process 900 involves determining whether a trigger has been detected, received, or otherwise obtained by the trigger detection device 710. If a trigger is not present, the process 900 can return to block 910.

If a trigger is present, the process 900 involves configuring the control device 102 to operate in the high-power mode for operating the occupancy sensor, as depicted at block 914. Block 914 can be implemented in a manner similar to that described above with respect to block 810 in FIG. 16.

In additional or alternative aspects, other power control schemes can be implemented using the control device 102. For example, in some aspects, when the load device 116 is not energized, the multi-mode control device 102 can be powered using the low-power module 112 to provide an amount of power sufficient to detect a button being pressed. When the load device 116 is energized, the multi-mode control device 102 can be powered by using the high-power module to harvest or otherwise obtain energy from current flowing through the load device 116. The amount of power used by the multi-mode control device 102 in the high-power mode can be sufficient to power a communication device 304 and/or other high-power circuitry 108.

In some aspects, the multi-mode control device 102 can switch between the low-power mode and the high-power mode based on information received from a sensor. For example, the communication device 304 can receive signals from a wireless occupancy sensor that is remote from the multi-mode control device 102. The signals can include occupancy information for a location that is serviced by the load device 116. The processing device 302 can obtain the occupancy information from the communication device 304. If the processing device 302 determines from the occupancy information that the location is occupied, the processing device 302 can refrain from changing the state of the load device 116 (e.g., allow a lighting device to remain in an "on" state). If the processing device 302 determines from the occupancy information that the location is not occupied, the processing device 302 can respond to receiving the occupancy information by changing the state of the load device 116 (e.g., setting the lighting device to an "off" state).

The processing device 302 can also respond to receiving information indicating that the location is no longer occupied by configuring the multi-mode control device 102 to enter the low-power mode. For example, a processing device 302 can turn on a transistor or use another switching component to allow current to flow to the processing device 302 from the low-power module 112, as described above with respect to FIG. 10. In some aspects, the low-power mode can allow the multi-mode control device 102 to detect a button press or another manual input that causes the multi-mode control device 102 to switch from the low-power mode to the high-power mode. In some aspects, in the low-power mode, the multi-mode control device 102 can periodically enable the communication device 304 in order to receive additional information (e.g., occupancy information). The processing device 302 can respond to the additional information by configuring the multi-mode control device 102 to switch from the low-power mode to the high-power mode.

In some aspects, the load device 116 can remain energized for a period of time after an occupancy sensor or other high-power sensing circuitry indicates that a location is no longer occupied. During this period, the load device 116 emits an indicator (e.g., a flashing light) that the load device 116 will be de-energized. If occupancy is sensed during the time period, the multi-mode control device 102 can refrain from changing the state of the load device 116. If occupancy is not sensed during the time period, the multi-mode control device 102 can change the state of the load device 116 (i.e., cause the load device 116 to be powered off).

In additional or alternative aspects, the multi-mode control device 102 can change the state of the load device 116 immediately after receiving information indicating that a location is not occupied. For example, the control device 102 can cause the load device 116 to be powered off in response to and immediately after determining that the location is not occupied. In a time period subsequent to the control device 102 causing the load device 116 to be powered off or otherwise changing the state of the load device 116, the processing device 302 can cause power to be provided to the communication device 304 to allow the communication device 304 to subsequently receive occupancy information from a remote wireless occupancy sensor. After causing the causing the load device 116 to be powered off or otherwise changing the state of the load device 116, the processing device 302 can start a timer corresponding to the specified time period. In some aspects, the processing device 302 can cause power to be provided to the communication device 304 continuously during the time period. In other aspects, the processing device 302 can cause power to be provided to the communication device 304 periodically or otherwise intermittently during the time period. If occupancy is sensed during the time period (e.g., before the timer expires), the multi-mode control device 102 can change the state of the load device 116 (e.g., cause the load device 116 to be powered on). If occupancy is not sensed during the time period (e.g., before the timer expires), the multi-mode control device 102 can refrain from changing the state of the load device 116 (e.g., allow the load device to remain powered off).

In additional or alternative aspects, the multi-mode control device 102 can be used to provide automatic dimming control based on harvesting of power from an environment in which the load device 116 is positioned (e.g., harvesting power from light energy). Data from a remote wireless daylight harvesting sensor can be received by the multi-mode control device 102 via a communication device 304. The multi-mode control device 102 can cause power to be removed from the load device 116 in response to determining that a threshold amount of ambient energy (e.g., light) is available in the environment. The processing device 302 can periodically enable the communication device 304 during a low-power mode to receive information about the amount of ambient energy in the environment (e.g., daylight harvesting information). The multi-mode control device 102 can cause the load device 116 to be energized in response to the processing device 302 determining that a threshold amount of ambient energy (e.g., light) is not available in the environment.

In additional or alternative aspects, the processing device 302 can periodically enable the communication device 304 during a low-power mode in order to receive a message from another device indicating that the load device 116 should be energized. The processing device 302 can respond to the receipt of such a message via the communication device 304 by configuring the multi-mode control device 102 to energize the load device 116. The processing device 302 can also respond to the receipt of this message by enabling the communication device 304 for continuous operation (i.e., by configuring the multi-mode control device 102 for operation in the high-power mode).

FIGS. 18-21 depict examples of processes used by the control device 102 to implement some of the features described above.

Figure 18:
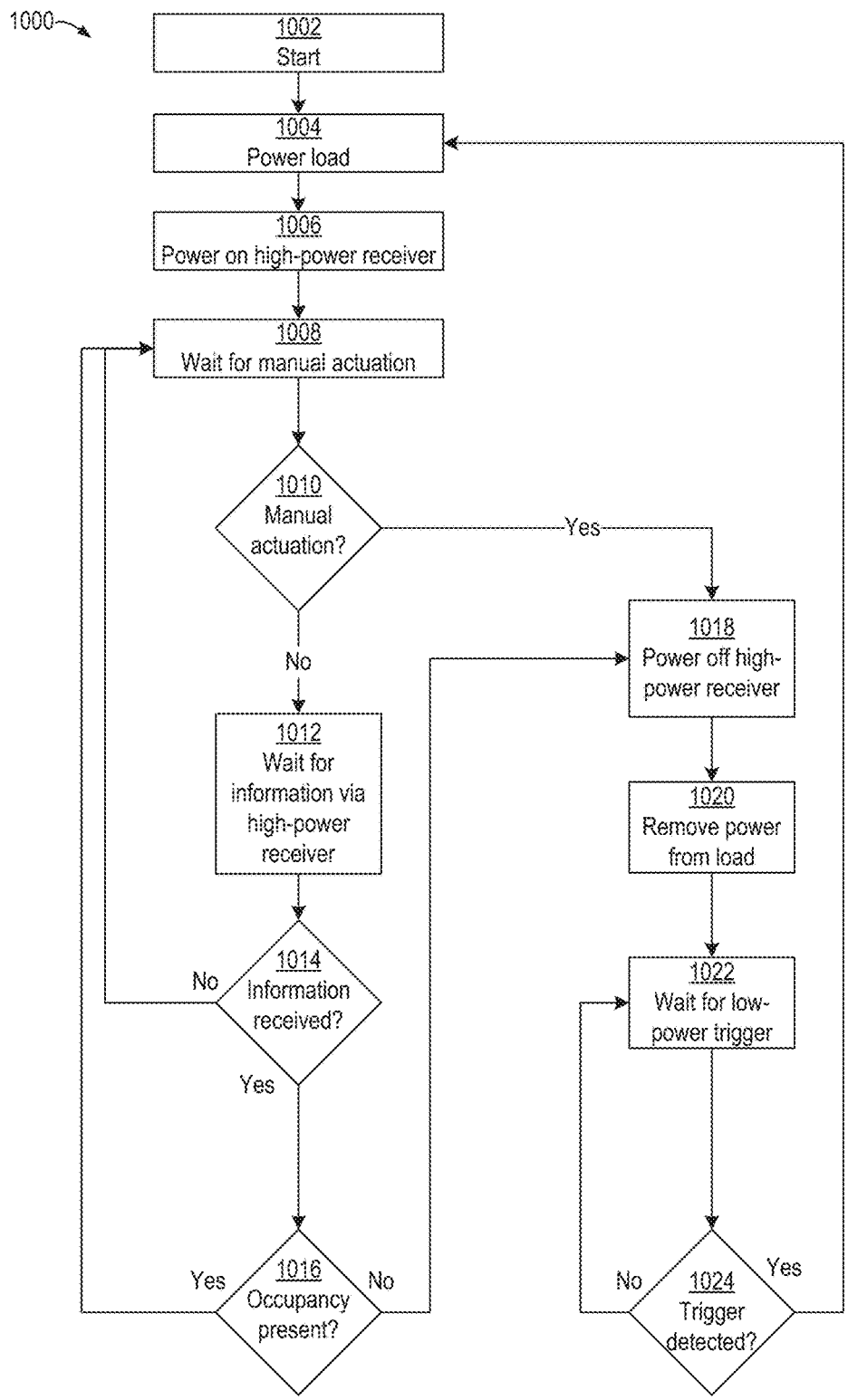
FIG. 18 is a flow chart depicting an example of a process for operating a multi-mode control device using a combination of manual inputs and information received from an occupancy sensor according to some aspects.

FIG. 18 is a flow chart depicting an example of a process 1000 for operating a multi-mode control device 102 using a combination of manual inputs and information received from an occupancy sensor or other high-power sensing circuitry. The process 1000 is described with respect to the implementations described above with respect to FIGS. 1-15. However, other implementations are possible. In some aspects, one or more operations described herein with respect to FIG. 18 can be used to implement one or more operations described above with respect to FIGS. 16 and 17.

At block 1002, the process 1000 starts. At block 1004, the process 1000 involves the load device 116 being powered. For example, the load device 116 can be powered using current provided by a power source 202. The control device 102, which may be in a low-power mode as described above with respect to FIGS. 1-15, can transmit a signal to a load controller 115 and/or the load device 116 that causes the load device 116 to enter a powered-on state. At block 1006, the process 1000 involves providing power to a high-power receiver (e.g., an occupancy sensor or other sensing circuitry 708, a radio or other communication device 304, etc.) of the control device 102. In some aspects, the processing device 302 can configure the control device 102 to enter or maintain a high-power mode. Configuring the control device 102 to enter or maintain a high-power mode can allow power to be provided to the high-power receiver (e.g., by receiving current via a high-power interface 105 to a high-power module 114, as described above with respect to FIGS. 1-15). The processing device may, for example, activate a transistor 406 or other suitable switching component (as described above with respect to FIG. 9) to allow current to flow to the communication device 304 from one or both of the low-power interface 104 and the high-power interface 105. In other aspects, the control device 102 can enter a high-power mode with requiring an operation by the processing device 302. For example, in the implementation depicted in FIG. 8, the high-power mode can involve current being received by the communication device 304 and other high-power circuitry 108 via electrical circuitry 301.

At block 1008, the process 1000 involves waiting for a manual actuation (e.g., a button press, a touch to a touch sensor, etc.) at the control device 102. For example, the processing device 302 can monitor an input received via an input pin or other port of the processing device 302 that is electrically coupled to a button, a touch sensor, or other component or group of components of the control device 102 that allow a user to manually actuate the control device 102 (e.g., by toggling the control device 102 between a low-power mode and a high-power mode). In some aspects, the control device 102 can be in a high-power mode described above with respect to FIGS. 1-15 when the processing device 302 monitors the input pin or other input port for a button press or other manual actuation. At block 1010, the process 1000 involves determining whether a manual actuation has been performed at the control device 102. The button or other manual input component can be used to toggle or otherwise change the state of the load device 116 between a powered state and an unpowered state. The button or other manual input can also be used to change the state of the control device 102 between a high-power mode and a low-power mode. The processing device 302 can determine that the manual actuation has been performed at the control device 102 based on a signal or other input detected by the processing device 302. The processing device 302 can detect a signal or other input at an input pin or other port of the processing device 302 that is electrically coupled to a button or other manual input component of the control device 102. If a button or other manual input component is pressed or otherwise actuated at block 1010, the process 1000 involves powering off the high-power receiver, as depicted at block 1018 and described below.

If a manual actuation is not performed, the process 1000 involves waiting for information to be received by the control device 102 via the high-power receiver, as depicted at block 1012. For example, the processing device 302 can communicate with the communication device 304 and/or the sensing circuitry 708 via an internal data bus to receive a message or other information. In one example, the communication device 304 may receive a message from another device such as (but not limited to) an occupancy sensor in a location serviced by the load device 116. In another example, the sensing circuitry 708 may detect occupancy or a lack thereof in a location serviced by the load device 116 or the control device 102 and provide occupancy information to the processing device 302. In some aspects, the control device 102 can be in a high-power mode described above with respect to FIGS. 1-15 when the processing device 302 communicates with the high-power receiver.

At block 1014, the process 1000 involves determining whether a message or other information has been received by the control device 102. If a message or other information has not been received by the control device 102, the process 1000 can return to block 1008 and wait for a manual actuation. If the high-power receiver receives a message or other information, the processing device 302 can determine whether the message or other information indicates that a location serviced by the load device 116 is occupied, as depicted at block 1016. In one example, the processing device 302 can reference data in a message received by the communication device 304 and determine from the data whether an occupancy sensor or other high-power sensing circuitry has detected activity indicative of occupancy in the serviced location. In one example, the processing device 302 can reference data received by an occupancy sensor or other sensing circuitry 708 and determine from the data whether activity indicative of occupancy has been detected. If the message or other information indicates that a location serviced by the load device 116 or control device 102 is occupied, the process 1000 can return to block 1008 and wait for a manual actuation. If the message or other information indicates that a location serviced by the load device 116 is not occupied, the process 1000 can proceed to block 1018.

At block 1018, the process 1000 involves powering off the high-power receiver if a manual actuation is detected at block 1010 and/or a lack of occupancy is determined at block 1016. For example, in some aspects, the processing device 302 can deactivate a transistor or other switching component (depicted above in FIGS. 8-10) connecting the communication device 304 or other high-power receiver to an electrical path in which current flows. In other aspects, the processing device 302 can configure the control device 102 to enter or maintain a low-power mode as described above with respect to FIGS. 1-15. Entering the low-power mode can cause the high-power receiver to be powered off. In other aspects, the processing device 302 can provide a control signal to the communication device 304 via a data bus of the control device 102 that instructs the communication device 304 to turn off.

At block 1020, the process 1000 involves removing power from the load device 116. In one example, the control device 102 can transmit a signal to a load controller 115 or directly to the load device 116 that causes the load device 116 to change from a powered-on state to a powered-off state. In another example, the control device 102 can configure one or more switching components in an electrical path between the load device 116 and a power source to reduce or prevent current flow to the load device 116.

In some aspects, the control device 102 can enter or maintain a low-power mode based on the load device 116 changing from a powered-on state to a powered-off state without action by the processing device 302. For example, in the implementations depicted in FIGS. 7 and 8, the load device 116 changing from a powered-on state to a powered-off state can result in a cessation or reduction of current being received via the high-power interface 105 (e.g., a circuit path 301 and/or a diode 404). This cessation or reduction of current can cause the low-power module 112 to be the primary or only source of power for the control device 102.

In other aspects, the processing device 302 can configure the control device 102 to enter or maintain a low-power mode prior to or concurrently with transmitting the signal that causes the load device 116 to change from a powered-on state to a powered-off state. For example, the processing device 302 can activate a transistor or other switching component as described above with respect to FIGS. 8-9 prior to or concurrently with transmitting the signal that causes the load device 116 to change from a powered-on state to a powered-off state. In other aspects, the processing device 302 can configure the control device 102 to enter or maintain a low-power mode subsequent to the load device 116 changing from a powered-on state to a powered-off state. For example, the processing device 302 can activate a transistor or other switching component as described above with respect to FIGS. 8-9 after sensing circuitry 508 is used to detect that the load device 116 has entered a powered-off state or other low-power state.

At block 1022, the process 1000 involves waiting for a low-power trigger to be detected by a trigger detection device 710. For example, in a low-power mode, the processing device 302 of the control device 102 can monitor an input pin or other input port that is communicatively coupled to a trigger detection device 710. In the low-power mode, current received by the control device 102 via the low-power interface 104 can be sufficient to power the processing device 302 for this monitoring operation. The trigger detection device 710 can be used to detect a signal, energy, data, or other trigger indicating that the control device 102 should toggle or otherwise change the state of the load device 116 between an unpowered state and a powered state. In one example, pressing a button or actuating some other manual input can configure the control device 102 to transmit a signal to the load controller 115 and/or the load device 116 to change the state of the load device 116. The button or other manual input can also be used to change the state of the control device 102 between a low-power mode and a high-power mode. In another example, receiving passive infrared energy via a passive infrared sensor of the control device 102 can cause the control device 102 to transmit a signal to the load controller 115 and/or the load device 116 to change the state of the load device 116. The detection of the passive infrared energy can also be used to change the state of the control device 102 between a low-power mode and a high-power mode. Any other suitable examples of triggers described above with respect to FIG. 10 can also be used at block 1022.

At block 1024, the process 1000 involves determining whether a low-power trigger has been detected. A low-power mode of the control device 102 can involve providing sufficient power to the processing device 302 to detect a low-power trigger using the trigger detection device 710. For example, in a low-power mode, the processing device 302 can determine whether a button has been pressed, passive infrared energy has been received, or any other suitable trigger has been detected based on a reading from an input pin or other input port that is communicatively coupled to the trigger detection device 710. If a low-power trigger has been detected, the process 1000 can return to block 1004, which involves providing power to the load device 116. The process 1000 can continue as described above. If a low-power trigger has not been detected, the process 1000 can return to block 1022.

Figure 19:
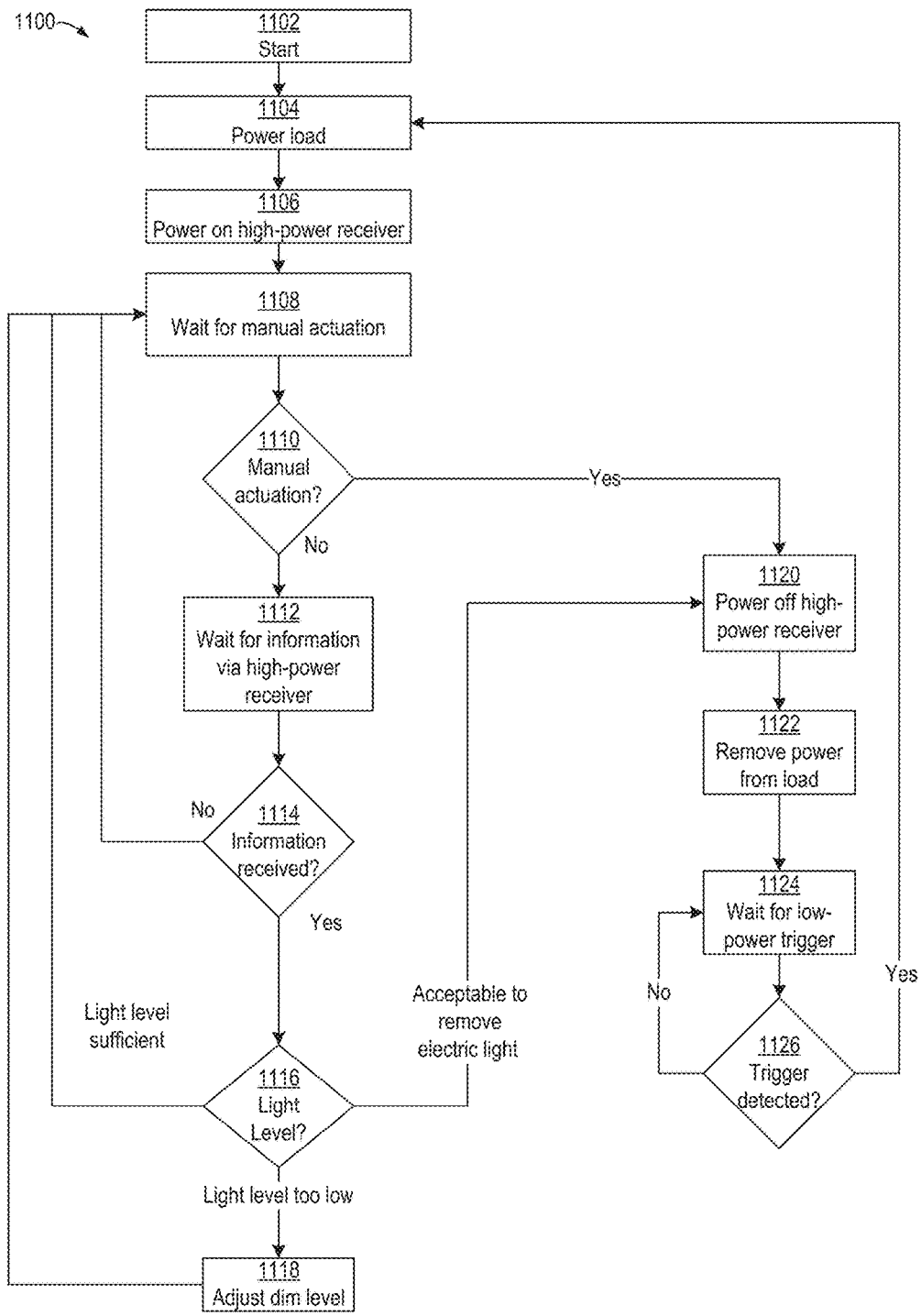
FIG. 19 is a flow chart depicting an example of a process for operating a multi-mode control device using a combination of manual inputs and information received from a light sensor according to some aspects.

FIG. 19 is a flow chart depicting an example of a process 1100 for operating a multi-mode control device 102 using a combination of manual inputs and information received from a light sensor. The process 1100 is described with respect to the implementations described above with respect to FIGS. 1-15. However, other implementations are possible. In some aspects, one or more operations described herein with respect to FIG. 19 can be used to implement one or more operations described above with respect to FIGS. 16 and 17.

At block 1102, the process 1100 starts. At block 1104, the process 1100 involves the load device 116 being powered. For example, the load device 116 can be powered using current provided by a power source 202. At block 1106, the process 1100 involves providing power to a high-power receiver (e.g., an occupancy sensor or other sensing circuitry 708, a radio or other communication device 304, etc.). Block 1106 can be implemented in a manner similar to that described above with respect to block 1006 in FIG. 18. For example, the processing device 302 can configure the control device 102 to enter or maintain a high-power mode such that power is provided to the communication device 304.

At block 1108, the process 1100 involves waiting for a manual actuation (e.g., a button press, a touch to a touch sensor, etc.) at the control device 102. Block 1108 can be implemented in a manner similar to that described above with respect to block 1008 in FIG. 18 For example, the processing device 302 can monitor an input received via an input pin or other port of the processing device 302 that is electrically coupled to a button or other manual input of the control device 102. At block 1110, the process 1100 determines whether a manual actuation has been performed at the control device 102. Block 1110 can be implemented in a manner similar to that described above with respect to block 1010 in FIG. 18.

If a manual actuation is not performed, the process 1100 involves waiting for information to be received by the control device 102 via the high-power receiver, as depicted at block 1112. Block 1112 can be implemented in a manner similar to that described above with respect to block 1012 in FIG. 18. For example, the processing device 302 can communicate with the communication device 304 via an internal data bus to receive a message or other information that the communication device 304 may receive from another device, such as (but not limited to) an light sensor in a location serviced by a load device 116 that is controlled by the control device 102.

At block 1114, the process 1100 involves determining whether a message or other information has been received by the control device 102. Block 1114 can be implemented in a manner similar to that described above with respect to block 1014 in FIG. 18. If a message or other information has not been received by the control device 102, the process 1100 can return to block 1108. If the high-power receiver receives a message or other information, the processing device 302 can determine a level of daylight or other light level indicated by the message, as depicted at block 1116. For example, the processing device 302 can reference data in a message received by the communication device 304 and determine from the data whether a light level provided by the load device 116 is too high or too low, whether the light level provided by the load device 116 is sufficient, or whether it is acceptable to remove electric light provided by the load device 116. If the message or other information indicates that a light level provided by the load device 116 is too high or too low, the process 1100 involves adjusting a dimming level, as depicted at block 1118. For example, the control device 102 can transmit a signal to a load controller 115 or directly to the load device 116 that causes the load device 116 to adjust a level of light provided in the location. If the light level provided by the load device 116 is sufficient, the process 1100 can return to block 1108. If it is safe or otherwise acceptable to remove electric light provided by the load device 116, the process 1100 can proceed to block 1120.

At block 1120, the process 1100 involves powering off the high-power receiver if a manual actuation is detected at block 1110 and/or it is determined at block 1116 that it is acceptable to remove electric light. Block 1120 can be implemented in a manner similar to that described above with respect to block 1018 in FIG. 18. At block 1122, the process 1100 involves removing power from the load device 116. Block 1122 can be implemented in a manner similar to that described above with respect to block 1020 in FIG. 18.

At block 1124, the process 1100 involves waiting for a low-power trigger to be detected by a trigger detection device 710. Block 1124 can be implemented in a manner similar to that described above with respect to block 1022 in FIG. 18. At block 1126, the process 1100 involves determining whether a low-power trigger has been detected. Block 1126 can be implemented in a manner similar to that described above with respect to block 1024 in FIG. 18. If a low-power trigger has been detected, the process 1100 can return to block 1104. If not, the process 1100 can return to block 1124.

Figure 20:
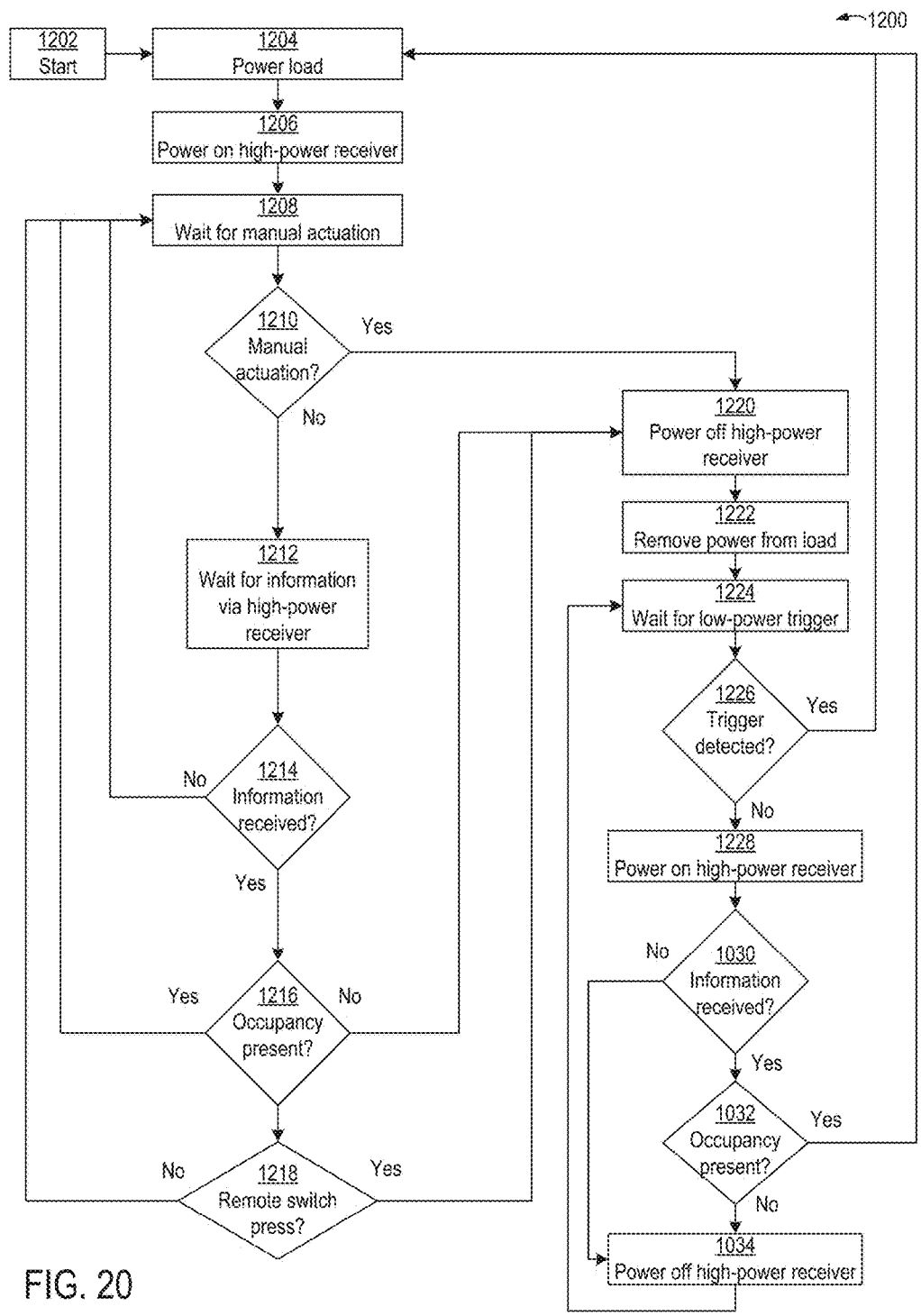
FIG. 20 is a flow chart depicting an example of a process for operating a multi-mode control device using a combination of manual inputs, sensor information received from an occupancy sensor, and control messages from a remote control device according to some aspects.

FIG. 20 is a flow chart depicting an example of a process 1200 for operating a multi-mode control device 102 using a combination of manual inputs, sensor information received from an occupancy sensor or other high-power sensing circuitry, and control messages from a remote control device. The process 1200 is described with respect to the implementations described above with respect to FIGS. 1-15. However, other implementations are possible. In some aspects, one or more operations described herein with respect to FIG. 20 can be used to implement one or more operations described above with respect to FIGS. 16 and 17.

At block 1202, the process 1200 starts. At block 1204, the process 1200 involves the load device 116 being powered. For example, the load device 116 can be powered using current provided by a power source 202. At block 1206, the process 1200 involves providing power to a high-power receiver (e.g., an occupancy sensor or other sensing circuitry 708, a radio or other communication device 304, etc.). Block 1206 can be implemented in a manner similar to that described above with respect to block 1006 in FIG. 18. For example, the processing device 302 can configure the control device 102 to enter or maintain a high-power mode such that power is provided to the communication device 304. At block 1208, the process 1200 involves waiting for a manual actuation (e.g., a button press, a touch to a touch sensor, etc.) at the control device 102. Block 1208 can be implemented in a manner similar to that described above with respect to block 1008 in FIG. 18. For example, the processing device 302 can monitor an input received via an input pin or other port of the processing device 302 that is electrically coupled to a button or other manual input of the control device 102.

At block 1210, the process 1200 involves determining whether a manual actuation has been performed at the control device 102. Block 1210 can be implemented in a manner similar to that described above with respect to block 1010 in FIG. 18.

If a manual actuation is not performed, the process 1200 involves waiting for information to be received by the control device 102 via the high-power receiver, as depicted at block 1212. Block 1212 can be implemented in a manner similar to that described above with respect to block 1012 in FIG. 18. For example, the processing device 302 can communicate with the communication device 304 via an internal data bus to receive a message or other information that the communication device 304 may receive from another device, such as (but not limited to) an occupancy sensor or other high-power sensing circuitry in a location serviced by a load device 116 controlled by the control device 102 or a remote control device within a communication range of the control device 102.

At block 1214, the process 1200 involves determining whether a message or other information has been received by the control device 102. Block 1214 can be implemented in a manner similar to that described above with respect to block 1014 in FIG. 18. For example, if a message or other information has not been received by the control device 102, the process 1200 can return to block 1208. If the high-power receiver receives a message or other information, the processing device 302 can determine whether the message or other information indicates that the location is occupied, as depicted at block 1216. Block 1216 can be implemented in a manner similar to that described above with respect to block 1016 in FIG. 18. If the message or other information indicates that the location is occupied, the process 1200 can return to block 1208. If the message or other information indicates that the location is not occupied, the process 1200 can proceed to block 1220.

If the message or other information is not indicative of occupancy in the location, the process 1200 involves determining whether the message or other information is indicative of a remote switch press from a remote control device, as depicted in block 1218. For example, the processing device 302 can reference data in a message received by the communication device 304 from a remote control device to determine if a remote switch press has been received from a remote control device. If a remote switch press has not been received from a remote control device, the process 1200 can return to block 1208. If a remote switch press has been received from a remote control device, the process 1200 can proceed to block 1220.

At block 1220, the process 1200 involves powering off the high-power receiver if a manual actuation is detected at block 1210, if occupancy is determined at block 1216, and/or if a remote switch press is determined at block 1218. Block 1220 can be implemented in a manner similar to that described above with respect to block 1018 in FIG. 18. At block 1222, the process 1200 involves removing power from the load device 116. Block 1222 can be implemented in a manner similar to that described above with respect to block 1020 in FIG. 18.

At block 1224, the process 1200 involves waiting for a low-power trigger to be detected by a trigger detection device 710. Block 1224 can be implemented in a manner similar to that described above with respect to block 1022 in FIG. 18. At block 1226, the process 1200 involves determining whether a low-power trigger has been detected. Block 1226 can be implemented in a manner similar to that described above with respect to block 1024 in FIG. 18. If a low-power trigger has been detected, the process 1200 can return to block 1204. If not, the process 1200 involves powering high-power receiver (e.g., a radio or other communication device 304) for a time period, as depicted at block 1228.

At block 1230, the process 1200 involves determining whether a message or other information has been received during the time period. Block 1230 can be implemented in a similar manner as that described above with respect to block 1214. If a message or other information has been received during the time period, the process 1200 involves determining whether the message or other information indicates that the location is occupied, as depicted at block 1232. Block 1232 can be implemented in a manner similar to that described above with respect to block 1216. If a message or other information has not been received during the time period, the process 1200 involves powering off a radio or other communication device 304, as depicted at block 1234. The process can return to block 1224.

Figure 21:
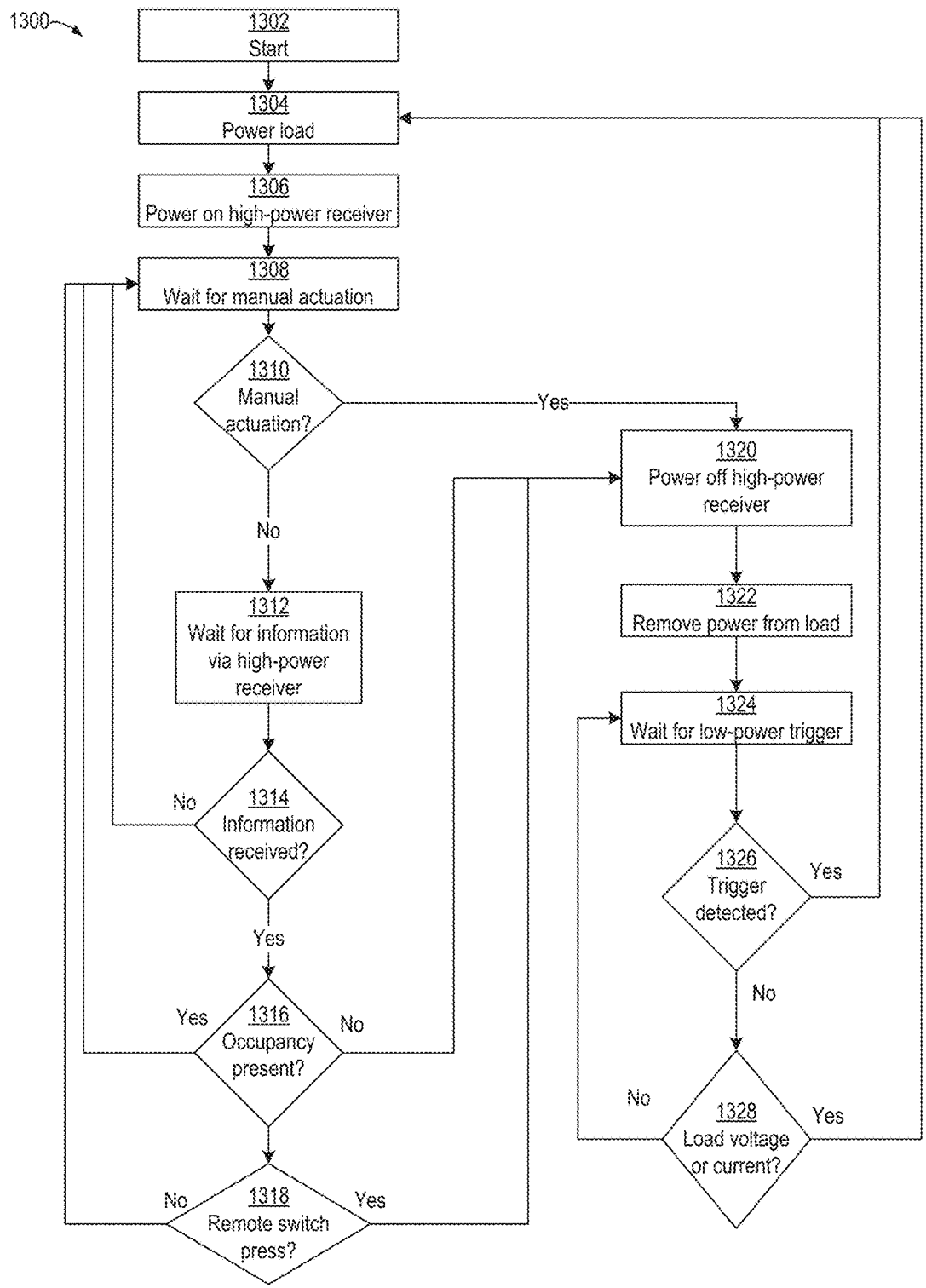
FIG. 21 is a flow chart depicting an example of a process for operating a multi-mode control device using a combination of manual inputs, information from sensors, and voltage detection at the load device according to some aspects.

FIG. 21 is a flow chart depicting an example of a process 1300 for operating a multi-mode control device 102 using a combination of manual inputs, information from sensors, and voltage detection at the load device 116. The process 1300 is described with respect to the implementations described above with respect to FIGS. 1-15. However, other implementations are possible. In some aspects, one or more operations described herein with respect to FIG. 21 can be used to implement one or more operations described above with respect to FIGS. 16 and 17.

At block 1302, the process 1300 starts. At block 1304, the process 1300 involves the load device 116 being powered. For example, the load device 116 can be powered using current provided by a power source 202. At block 1306, the process 1300 involves providing power to a high-power receiver (e.g., an occupancy sensor or other sensing circuitry 708, a radio or other communication device 304, etc.). Block 1306 can be implemented in a manner similar to that described above with respect to block 1006 in FIG. 18.

At block 1308, the process 1300 involves waiting for a manual actuation (e.g., a button press, a touch to a touch sensor, etc.) at the control device 102. Block 1308 can be implemented in a manner similar to that described above with respect to block 1008 in FIG. 18. For example, the processing device 302 can monitor an input received via an input pin or other port of the processing device 302 that is electrically coupled to a button or other manual input of the control device 102. At block 1310, the process 1300 involves determining whether a manual actuation has been performed at the control device 102. Block 1310 can be implemented in a manner similar to that described above with respect to block 1010 in FIG. 18.

If a manual actuation is not performed, the process 1300 involves waiting for information to be received by the control device 102 via the high-power receiver, as depicted at block 1312. Block 1312 can be implemented in a manner similar to that described above with respect to block 1012 in FIG. 18. For example, the processing device 302 can communicate with the communication device 304 via an internal data bus to receive a message or other information that the communication device 304 may receive from another device, such as (but not limited to) an occupancy sensor or other high-power sensing circuitry in a location serviced by a load device 116 controlled by the control device 102 or a remote control device within a communication range of the control device 102.

At block 1314, the process 1300 involves determining whether a message or other information has been received by the control device 102. Block 1314 can be implemented in a manner similar to that described above with respect to block 1014 in FIG. 18. For example, if a message or other information has not been received by the control device 102, the process 1300 can return to block 1308. If the high-power receiver receives a message or other information, the processing device 302 can determine whether the message or other information indicates that the location is occupied, as depicted at block 1316. Block 1316 can be implemented in a manner similar to that described above with respect to block 1016 in FIG. 18. If the message or other information indicates that the location is occupied, the process 1300 can return to block 1308. If the message or other information indicates that the location is not occupied, the process 1300 can proceed to block 1320.

If the message or other information is not indicative of occupancy in the location, the process 1300 involves determining whether the message or other information is indicative of a remote switch press from a remote control device, as depicted in block 1318. For example, the processing device 302 can reference data in a message received by the communication device 304 from a remote control device to determine a remote switch press has been received from a remote control device. If not, the process 1300 can return to block 1308. If so, the process 1300 can proceed to block 1320.

At block 1320, the process 1300 involves powering off the high-power receiver if a manual actuation is detected at block 1310, if occupancy is determined at block 1316, and/or if a remote switch press is determined at block 1318. Block 1320 can be implemented in a manner similar to that described above with respect to block 1018 in FIG. 18. At block 1322, the process 1300 involves removing power from the load device 116. Block 1322 can be implemented in a manner similar to that described above with respect to block 1020 in FIG. 18.

At block 1324, the process 1300 involves waiting for a low-power trigger to be detected by a trigger detection device 710. Block 1324 can be implemented in a manner similar to that described above with respect to block 1022 in FIG. 18. At block 1326, the process 1300 involves determining whether a low-power trigger has been detected. Block 1326 can be implemented in a manner similar to that described above with respect to block 1024 in FIG. 18. If a low-power trigger has been detected, the process 1300 can return to block 1304. If not, the process 1300 involves determining whether a voltage or current is detectable at the load device 116, as depicted at block 1328. For example, the processing device 302 can use sensing circuitry to determine if a voltage or current is present at the load device 116, as described above with respect to FIGS. 9 and 10. If a voltage is detectable at the load device 116, the process 1300 can return to block 1304. If a voltage is not detectable at the load device 116, the process 1300 can return to block 1324.

The foregoing is provided for purposes of illustrating, describing, and explaining aspects of the present invention and is not intended to be exhaustive or to limit the invention to the precise forms disclosed. Further modifications and adaptation to these embodiments will be apparent to those skilled in the art and may be made without departing from the scope and spirit of the invention. Different aspects described above can be combined with one another.

What is claimed is:

1. A multi-mode control device for controlling operation of a load device, the multi-mode control device comprising:
    a high-power interface electrically couplable to a high-power module electrically coupled to a power source external to the multi-mode control device;
    an occupancy sensor configured to receive a first current from the high-power module via the high-power interface;
    a trigger detection device that is coupled to a low-power interface of the multi-mode control device, wherein the low-power interface comprises current limiting circuitry electrically couplable in series with the power source and configured to receive a second current from the power source that is less than the first current; and
    a processing device configured for switching the multi-mode control device from a high-power mode for powering the occupancy sensor to a low-power mode by performing operations comprising:
        causing a reduction in the first current provided to the occupancy sensor, and
        causing the second current to be provided to the trigger detection device;
    wherein the trigger detection device is configured for detecting, in the low-power mode, a trigger;
    wherein the processing device is further configured for causing the control device to operate in the high-power mode based on the trigger detection device detecting the trigger.

2. The multi-mode control device of claim 1, wherein the low-power interface comprises a switching component configured for selectively providing an electrical path to the trigger detection device from at least one of an energy storage device and an energy harvesting device.

3. The multi-mode control device of claim 2, wherein the low-power interface further comprises an additional switching component configured for providing an electrical path through the trigger detection device to ground.

4. The multi-mode control device of claim 1, wherein the power source comprises a DC power source.

5. The multi-mode control device of claim 1, wherein the high-power module is configured for providing current from the power source to the load device.

6. The multi-mode control device of claim 1, wherein the high-power module is configured for providing current to the load device from an additional power source independent of the power source electrically coupled to the high-power interface.

7. The multi-mode control device of claim 1, wherein the high-power interface comprises a transistor between the high-power module and circuitry of the multi-mode control device configured to receive current from the power source via the transistor;
    wherein the processing device is further configured for switching the multi-mode control device from the high-power mode to the low-power mode by causing the transistor to prevent current flow from the power source toward the circuitry of the multi-mode control device.

8. The multi-mode control device of claim 1, wherein the trigger comprises RF energy.

9. The multi-mode control device of claim 1, wherein the trigger comprises a network message.

10. The multi-mode control device of claim 1, wherein the trigger comprises infrared energy.

11. The multi-mode control device of claim 1, wherein the trigger comprises sounds or vibrations.

12. The multi-mode control device of claim 1, wherein the trigger comprises a change in an environmental condition.

13. A method comprising:
    providing a high-power interface that is coupled to a high-power module, the high-power module electrically coupled to a power source external to a multi-mode control device;
    receiving, by an occupancy sensor, a first current from the high-power module via the high-power interface;
    providing a trigger detection device that is coupled to a low-power interface of the multi-mode control device, wherein the low-power interface comprises current limiting circuitry electrically coupled in series with the power source, wherein the low-power interface receives a second current from the power source that is less than the first current;
    switching, by a processing device, the multi-mode control device from a high-power mode for powering the occupancy sensor to a low-power mode by performing operations comprising:
        causing a reduction in the first current provided to the occupancy sensor, and
        causing the second current to be provided to the trigger detection device;
    detecting, in the low-power mode and using the trigger detection device, a trigger;
    causing the control device to operate in the high-power mode based on the detecting the trigger.

14. The method of claim 13, wherein the low-power interface comprises a switching component that selectively provides an electrical path to the trigger detection device from at least one of an energy storage device and an energy harvesting device.

15. The method of claim 13, wherein the low-power interface further comprises a switching component that provides an electrical path through the trigger detection device to ground.

16. The method of claim 13, wherein the high-power module provides current from the power source to a load device.

17. The method of claim 13, wherein the high-power module provides current to a load device from an additional power source independent of the power source electrically coupled to the high-power interface.

18. The method of claim 13, wherein the high-power interface comprises a transistor between the high-power module and circuitry of the multi-mode control device that receives current from the power source via the transistor;
    wherein the method further comprises switching the multi-mode control device from the high-power mode to the low-power mode by causing the transistor to prevent current flow from the power source toward the circuitry of the multi-mode control device.

19. The method of claim 13, wherein the trigger comprises at least one of RF energy, infrared energy, or a network message.

20. The method of claim 13, wherein the trigger comprises sounds, vibrations, or a change in an environmental condition.

* * * * *